US009583097B2

(12) United States Patent
Agrawal et al.

(10) Patent No.: US 9,583,097 B2
(45) Date of Patent: Feb. 28, 2017

(54) DYNAMIC INFERENCE OF VOICE COMMAND FOR SOFTWARE OPERATION FROM HELP INFORMATION

(71) Applicant: Google Technology Holdings LLC, Mountain View, CA (US)

(72) Inventors: Amit Kumar Agrawal, Bangalore (IN); Raymond B. Essick, IV, Glen Ellyn, IL (US); Satyabrata Rout, Bhubaneswar (IN)

(73) Assignee: Google Inc., Mountain View, CA (US)

( * ) Notice: Subject to any disclaimer, the term of this patent is extended or adjusted under 35 U.S.C. 154(b) by 26 days.

(21) Appl. No.: 14/609,973

(22) Filed: Jan. 30, 2015

(65) Prior Publication Data

US 2016/0225371 A1    Aug. 4, 2016

(51) Int. Cl.
| | | |
|---|---|---|
| *G10L 21/00* | (2013.01) | |
| *G10L 15/07* | (2013.01) | |
| *G06F 3/16* | (2006.01) | |
| *G06F 3/0484* | (2013.01) | |
| *G06F 3/0488* | (2013.01) | |
| *G10L 21/06* | (2013.01) | |

(52) U.S. Cl.
CPC ........... *G10L 15/075* (2013.01); *G06F 3/0488* (2013.01); *G06F 3/04842* (2013.01); *G06F 3/167* (2013.01); *G10L 21/06* (2013.01); *G06F 2203/0381* (2013.01)

(58) Field of Classification Search
CPC ........ G10L 15/22; G10L 15/265; H06F 3/167; H04M 2201/40
USPC ........................................................ 704/275
See application file for complete search history.

(56) References Cited

U.S. PATENT DOCUMENTS

| | | | | |
|---|---|---|---|---|
| 5,748,191 A | | 5/1998 | Rozak | |
| 6,370,237 B1 * | | 4/2002 | Schier ................... | H04M 1/271 379/216.01 |
| 6,404,876 B1 * | | 6/2002 | Smith ............... | H04M 3/42204 379/201.07 |
| 6,584,439 B1 * | | 6/2003 | Geilhufe ................ | G10L 15/26 704/270 |
| 7,529,677 B1 * | | 5/2009 | Wittenberg ............. | G10L 15/30 704/270 |

(Continued)

OTHER PUBLICATIONS

International Search Report and Written Opinion correlating to PCT/US2016/014112 dated May 6, 2016, 12 pages.

(Continued)

*Primary Examiner* — Jesse Pullias

(57) ABSTRACT

In an electronic device, a method includes analyzing help information associated with a software application to identify a sequence of manipulations of viewable elements associated with an instance of an operation by the software application. The method further includes generating a voice command set based on the sequence of manipulations of viewable elements and storing the voice command set. The method further includes receiving voice input from a user, determining the voice input represents a voice command of the voice command set, and performing an emulated manipulation sequence of viewable elements based on the voice command to actuate an instance of the operation by the software application, the emulated manipulation sequence based on the sequence of manipulations of viewable elements.

28 Claims, 19 Drawing Sheets

(56) References Cited

U.S. PATENT DOCUMENTS

| | | | |
|---|---|---|---|
| 2004/0234047 A1* | 11/2004 | Ciccarelli | ............... H04L 12/58 379/88.16 |
| 2006/0206336 A1* | 9/2006 | Gurram | ................... G06F 3/167 704/275 |
| 2012/0198362 A1 | 8/2012 | Urban | |
| 2012/0215543 A1 | 8/2012 | Oez | |
| 2013/0297318 A1 | 11/2013 | Balasubramanyam | |
| 2016/0225369 A1 | 8/2016 | Agrawal | |

OTHER PUBLICATIONS

International Search Report and Written Opinion correlating to PCT/US2016/014118 dated May 5, 2016, 10 pages.

\* cited by examiner

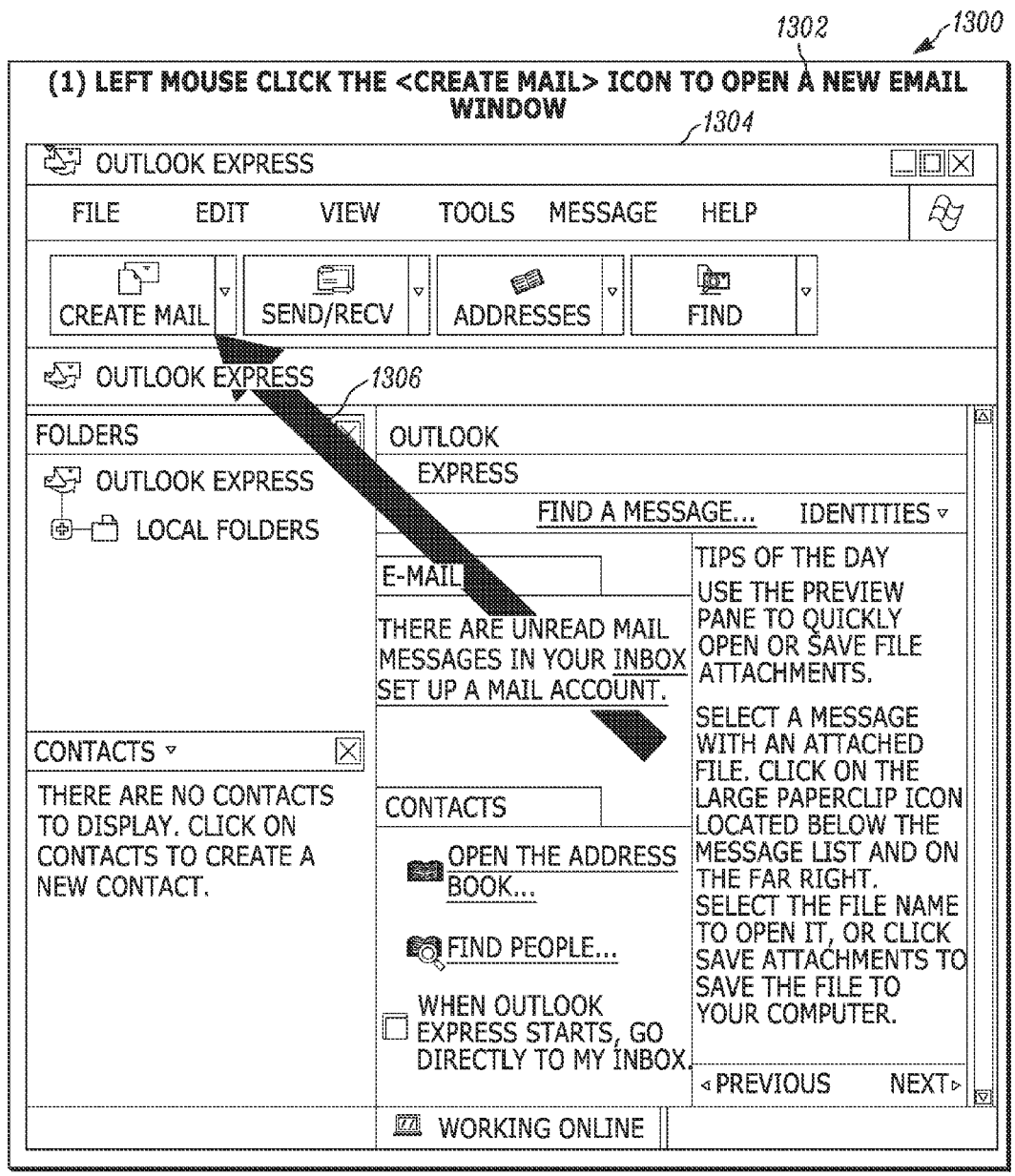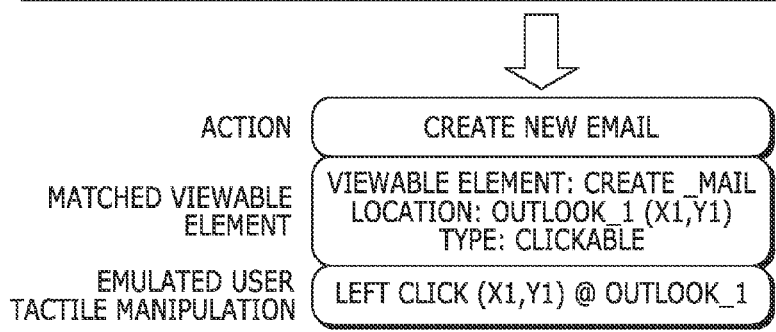
FIG. 13

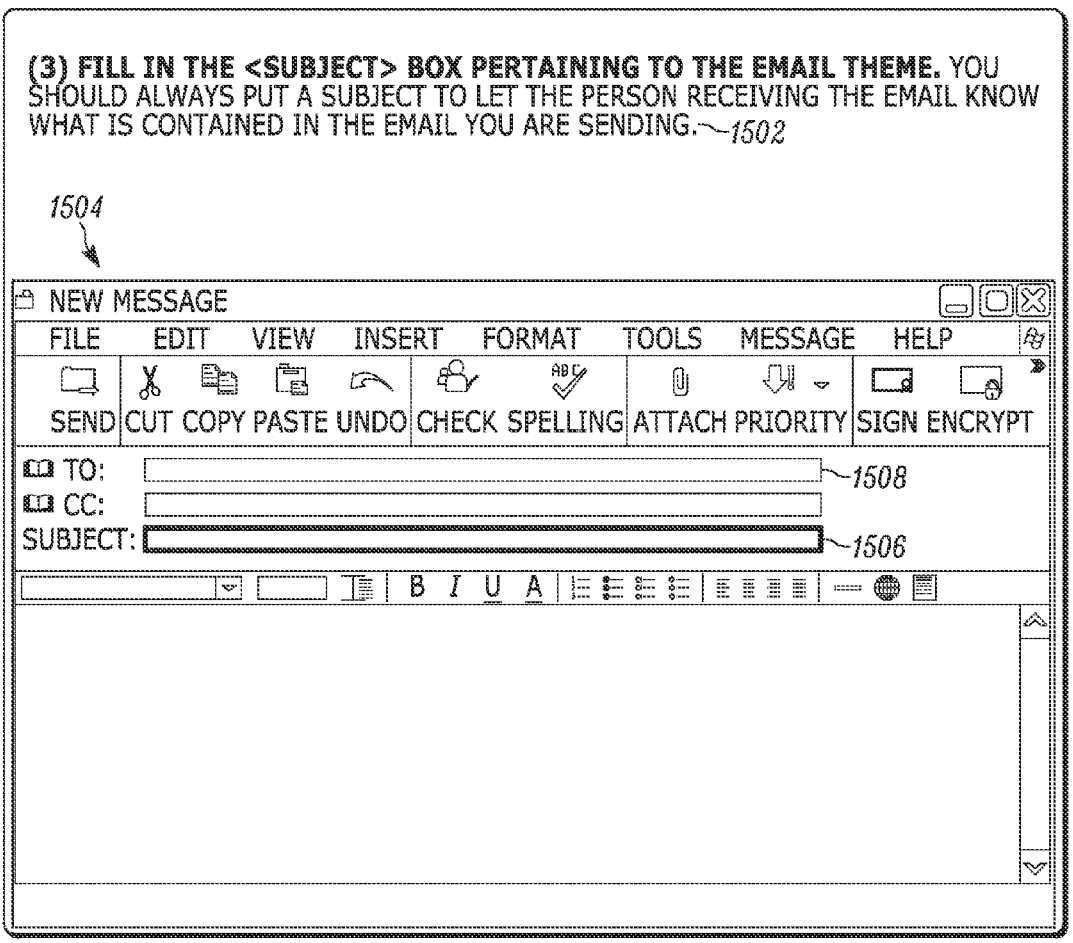
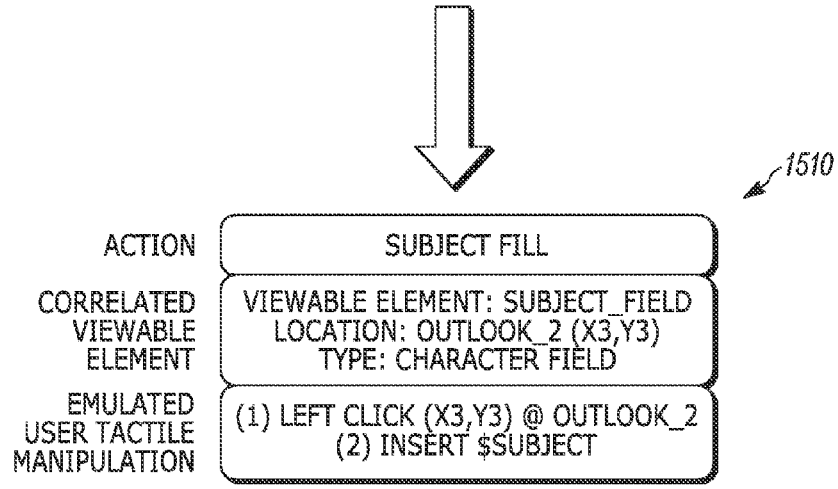
FIG. 15

(4) TYPE IN YOUR MESSAGE INTO THE MAIL BODY OF EMAIL. THE AREA FOR TYPING WORKS JUST LIKE A WORD PROCESSOR PROGRAM. COMPLETE YOUR MESSAGE AND IT IS NOW READY TO ADDRESS AND SEND (WHEN YOU LEARN THE BASICS OF EMAIL COMPOSITION, THERE ARE COUNTLESS THINGS YOU CAN DO WHEN COMPOSING AND EMAIL, LIKE PICTURES, COPY AND PASTE TEXT FROM THE INTERNET OR OTHER DOCUMENT, OR HAVE FANCY BACKGROUND STATIONERY.) FILL IN TEXT IN THE <SUBJECT> BOX PERTAINING TO THE EMAIL THEME. YOU SHOULD ALWAYS PUT A SUBJECT TO LET THE PERSON RECEIVING THE EMAIL KNOW WHAT IS CONTAINED IN THE EMAIL YOU ARE SENDING.

| | |
|---|---|
| ACTION | BODY FILL |
| CORRELATED VIEWABLE ELEMENT | VIEWABLE ELEMENT: BODY_FIELD<br>LOCATION: OUTLOOK_2 (X4,Y4)<br>TYPE: CHARACTER FIELD |
| EMULATED USER TACTILE MANIPULATION | (1) LEFT CLICK (X4,Y4) @ OUTLOOK_2<br>(2) INSERT $ BODY |

FIG. 16

DYNAMIC INFERENCE OF VOICE COMMAND FOR SOFTWARE OPERATION FROM HELP INFORMATION

CROSS REFERENCE TO RELATED APPLICATIONS

This application is related to U.S. patent application Ser. No. 14/609,954, entitled "DYNAMIC INFERENCE OF VOICE COMMAND FOR SOFTWARE OPERATION FROM USER MANIPULATION OF ELECTRONIC DEVICE" and filed on even date herewith, the entirety of which is incorporated by reference herein.

FIELD OF THE DISCLOSURE

The present disclosure relates generally to user manipulation of electronic devices and more particularly to user voice commands to actuate operations at electronic devices.

BACKGROUND

Traditionally, users have interacted with electronic devices through the manipulation of various viewable elements presented to the users, such as physical buttons or switches on a housing of an electronic device or virtual buttons and other virtual user-selectable elements presented via a display screen of an electronic device. However, to facilitate more efficient interactions, attempts have been made to implement touchless control via voice commands issued by users. A persistent impediment in achieving this goal has been the accurate translation of a voice utterance into the appropriate sequence of interactions with one or more software applications on the electronic device. One conventional approach is to provide specific application programmer interfaces (APIs) for the semantics of typical voice commands. However, due to the lack of standardization among the multitude of software applications available, this approach typically limits a user's ability to use voice commands to a very small subset of the software applications installed on an electronic device. Another conventional approach is to manually map predefined voice commands to a sequence of manipulation events. This approach suffers from similar limitations in that it is impracticable to implement on a large scale, particularly given the vast number of software applications, as well as their different versions. These problems of scale and consistency thus have prevented widespread adoption of voice control for electronic devices capable of supporting multiple software applications.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIGS. 13-18 are diagrams illustrating an example of the method of FIGS. 11 and 12 in accordance with at least one embodiment of the present disclosure.

DETAILED DESCRIPTION

Figure 1:
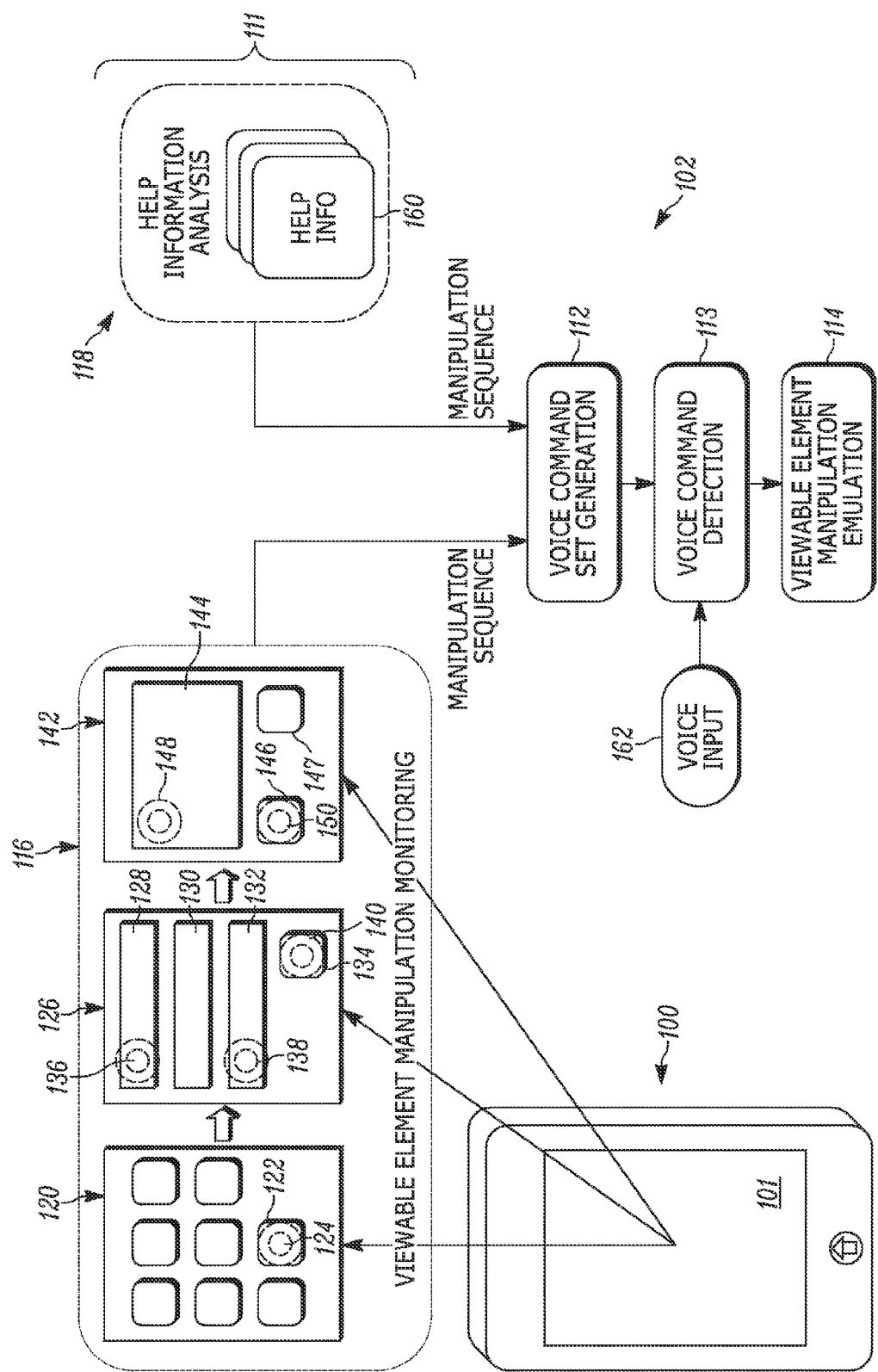
FIG. 1 is a diagram illustrating an electronic device employing dynamic inference of voice commands for software operations in accordance with at least one embodiment of the present disclosure.

The following description is intended to convey a thorough understanding of the present disclosure by providing a number of specific embodiments and details involving dynamic inference of a voice command for a software operation at an electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-19 illustrate example techniques for dynamic inference of one or more voice commands and corresponding viewable element manipulation sequences to actuate an operation by one or more software applications at an electronic device. In some embodiments, the electronic device monitors a user's manipulations of viewable elements at the electronic device to identify a sequence of tactile manipulations of viewable elements performed by the user to actuate an instance of a software operation. From this sequence, from descriptive information and other metadata associated with the viewable elements in the sequence, and from synonym information identifying alternative terms, the electronic device generates a voice command set of one or more voice commands that, when uttered by a user, triggers the electronic device to emulate the same sequence of tactile manipulations of viewable elements so as to activate an instance of the software operation. In some scenarios, the operation may transition from one software application to any of a plurality of alternative applications, and in such cases a voice command set and viewable element manipulation sequence for an alternative version of the operation utilizing a different software application may also be inferred. For example, a user's tactile interactions may be monitored to identify an operation involving the capture of a picture using a camera application and then sharing the picture via one social media application. The electronic device may identify another social media application as an alternative to the original social media application, and from this derive a separate voice command set and tactile manipulation sequence to emulate an alternative version of the operation that uses the other social media application to share a captured picture.

In other embodiments, the electronic device analyzes user help information associated with a software operation to identify a sequence of manipulations of viewable elements that actuate the software operation, and from this generates a voice command set of one or more voice commands. When the user utters a voice command matching this voice command set, the electronic device emulates the sequence of manipulations of viewable elements to actuate an instance of the software operation. The user help information (hereinafter, "help information") used to infer the voice command set and corresponding emulated viewable element manipulation sequence can include, for example, user help webpages, instructional videos, or other remotely-accessed user help information, user help information locally stored at the electronic device (e.g., as a help data file accessed by the software application executable), and the like. The user help information may take the form of text information describing the actions involved in the software operation and the viewable elements to be manipulated by the user to perform the actions, graphical information, such as screenshots of the software application, annotated illustrations of these actions, instructional videos, and the like.

Further, after dynamically inferring a voice command set and corresponding viewable element manipulation sequence either from user tactile manipulation monitoring or from help information analysis, the electronic device, in some embodiments, can share the voice command set/viewable element manipulation sequence with other electronic devices via a networked service. To illustrate, the voice command set/viewable element manipulation sequence may be uploaded to a remote server, whereupon other electronic devices may download the voice command set/viewable element manipulation sequence for implementation at the respective other electronic devices. This download may occur as a periodic update, as part of the download and install of a software application associated with the operation (or download and install of an update thereto), as part of the download and install of an operating system (or download and install of an update thereto), or at a user's initiative.

The dynamic inference of a voice command set and corresponding emulated viewable element manipulation sequence based on user tactile observation or help information analysis permits voice commands to be implemented for software operations without requiring manual generation of voice commands or emulated viewable element manipulation sequences for a particular software application and without requiring consistent or standardized APIs for voice command functionality. As such, the voice command functionality of the electronic device can readily scale as the user interacts with the electronic device or as the availability of user help information grows. Moreover, the inference of a voice command set from monitored user manipulation results in a voice command set and emulated viewable element manipulation that mimics the user's particular approach to interacting with the software application to actuate the operation, and thus provides the user with a more natural and comfortable approach to touchless control of the electronic device.

FIG. 1 illustrates an electronic device 100 implementing techniques for dynamic inference of voice commands for software operations in accordance with at least one embodiment of the present disclosure. The electronic device 100 can include any of a variety of devices that execute software applications responsive to user input in the form of tactile manipulation of viewable elements, such as a computing-enabled cellular phone ("smartphone") or computing-enabled watch ("smartwatch"), tablet computer, notebook computer, desktop computer, gaming console, personal digital assistant (PDA), vehicular user control system, and the like.

In at least one embodiment, the electronic device 100 executes one or more software applications that utilize user input to actuate various operations, or chains of operations. Consistent with conventional approaches, the user input may be supplied in the form of the user's manipulation of various viewable elements presented by the electronic device 100 in association with a software application. These viewable elements may include physical user input features, such as physical buttons, physical switches, and the like, or virtual input features presented via a display and manipulated by the user via a user input device (e.g., a touchscreen, keyboard, or mouse). The virtual input features may include, for example, virtual clickable buttons or icons, virtual fill-in fields, virtual pull-down lists, radio buttons, checkboxes, and the like. To actuate an instance of an operation performed by one or more software applications, the user may tactilely manipulate viewable elements in a specific sequence and which are presented in a particular sequence of one or more view screens by the electronic device 100, and this particular sequence of tactile manipulations of viewable elements (referred to herein as a "viewable element manipulation sequence") controls the one or more software applications (and the underlying operating system) to actuate an instance of a corresponding operation.

To illustrate, to send a simple messaging service (SMS) message (one example of an operation) a user may "click" an icon associated with a text messaging application on a main view screen of the electronic device 100, which results in the OS launching or shifting "focus" to the text application, which in turn causes the device's GPU to display a main view screen of the text messaging application. In this main screen, the user may "click" a "compose" icon, which in turn triggers the text messaging application to display a compose text view screen having a destination ("To:") field and a body field, both of which the user may fill in using a physical or virtual keyboard of the electronic device. The compose text view screen further may have a "send" icon that triggers the text messaging application to transmit the text input into the body field as a SMS message to the destination address input into the destination field.

While achieving the goal of activating an instance of a desired software operation, user tactile manipulation typically is less efficient compared to the issuance of a voice command that triggers the software application to perform the same operation. However, it typically is not practicable for the OS or every software application to be preconfigured with voice commands that activate corresponding operations, nor is it typically very likely that a user will make the effort to attempt to program such voice commands directly, or memorize pre-configured voice commands, if such capability is even available. Accordingly, to facilitate more efficient touchless control of the electronic device 100, in at least one embodiment the electronic device 100 implements a dynamic voice command inference process 102 so as to dynamically infer a viewable element manipulation sequence that successfully activates a corresponding operation of one or more software applications. This process also infers a voice command set of one or more voice commands that, when uttered by the user, triggers the electronic device 100 to emulate the viewable element manipulation sequence so as to activate an instance of the corresponding application.

As depicted in FIG. 1, the dynamic voice command inference process 102 generally has four phases: a manipulation sequence inference phase 111, a voice command set generation phase 112, a voice command detection phase 113, and a manipulation emulation phase 114. During the manipulation sequence inference phase 111 the electronic device 100 determines, or infers, a particular sequence of viewable elements in a particular sequence of view screens, and the manner of their manipulation in the identified order, so as to direct a software application (or set of software applications) to activate a corresponding operation.

The electronic device 100 may infer the viewable element manipulation sequence in at least two ways (or a combination of at least those two ways): a manipulation monitoring process 116 or a help information analysis process 118. For the manipulation monitoring process 116, the user's tactile interactions with the electronic device 100 serve as the indication of which viewable elements of which view screens are to be manipulated in which order so as to activate a corresponding operation. Thus, when implementing the manipulation monitoring process 116, the electronic device 100 monitors one or more iterations of the user's tactile manipulations of viewable elements presented to the user through view screens so as to learn the viewable element manipulation sequence that controls the one or more software applications to perform the operation.

To illustrate, to send an email (one example of an operation), a user may navigate to a home desktop view screen 120 of the OS and from there touch a touchscreen 101 at a location within a range of locations at which a GPU of the electronic device 100 displays an email icon 122 associated with an email application. In response to this touch input at this location (denoted herein as "tactile manipulation 124") on the home view screen 120, the OS launches the email application, which presents a compose mail view screen 126. The compose mail view screen 126 presents multiple viewable elements, including a to: field 128 for inputting a destination email address, a cc: field 130 for inputting a carbon copy email address, a subject field 132 for inputting a subject line for the email being composed, and an ok button 134 to signal that the user has completed entry of the input fields of the compose mail view screen 126. The user touches the touchscreen 101 at a location within a range of locations of the to: field 128 and inputs via a virtual or physical keyboard a destination email address character string (together denoted herein as "tactile manipulation 136"), touches the touchscreen 101 at a location within a range of locations of the subject field 132 and inputs a subject character string via the keyboard (together denoted herein as "tactile manipulation 138"), and then touches the touchscreen 101 at a location of a range of locations for the ok button 134 (denoted herein as "tactile manipulation 140"). In response, the email application presents another view screen 142, which contains a body field 144, a send button 146, and a cancel button 147. The user touches the touchscreen 101 at a location within a range of locations for the body field 144 and inputs a body content string via the keyboard (together denoted herein as "tactile manipulation 148"), and then touches the touchscreen 101 at a location within a range of locations associated with the send button 146 (denoted herein as "tactile manipulation 150"). In response, the email application prepares an email having the corresponding destination address field, subject, and body, and initiates transmission of this email.

After observing the user perform this sequence one or more times, the electronic device 100 infers a viewable element manipulation sequence of: tactile manipulation 124 (touchscreen contact at a location "A" of view screen 120)→tactile manipulation 136 (touchscreen contact at a location "B" of view screen 126 followed by a character string input of variable length)→tactile manipulation 138 (touchscreen contact at a location "C" of view screen 126 followed by a character string input of variable length)→tactile manipulation 140 (touchscreen contact at a location "D" of view screen 126)→tactile manipulation 148 (touchscreen contact at a location "E" of view screen 142 followed by a character string input of variable length)→tactile manipulation 150 (touchscreen contact at location "F" of view screen 142). As described below, this particular manipulation sequence will serve as the basis for emulation of user input in order to automatically activate the operation in response to a voice command from the user during the manipulation emulation phase 114. The manipulation monitoring process 116 is described in greater detail below with reference to FIGS. 4-8.

For the voice command inference approach using the help information analysis process 118, the electronic device 100 analyzes help information 160 made available to users for the purposes of instructing or otherwise helping the users to interact with an associated software application to perform a corresponding operation. This help information 160 may take the form of a web page or other documentation available from a remote server or locally stored help information (such as the help information embedded with the software application itself). The help information 160 may be presented in the form of text description, screenshots or other graphical representations, video or audio, or a combination thereof. For example, the help information 160 could include a webpage describing the steps for composing and sending an email using a particular email application, with each step having a screenshot of a corresponding view screen of the email application and text or other graphics describing how the user is to manipulate one or more viewable elements depicted in the screenshot to initiate an action that is part of the email compose operation. From this, the electronic device 100 (or a remote server) can analyze the screenshots and text to identify the viewable elements that are manipulated to active the software operation, as well as the order of their manipulation and the type of manipulation for each viewable element.

As another example, the help information 160 could include a help video tutorial or other instructional video that presents video capture of the view screens of the software application as the instructor interacts with the software application to compose and send an email, along with an audio recording of the instructor describing the interaction with the software application. In this case, the electronic device 100 (or, alternatively, a remote server, as described below) could extract image frames from the video (e.g., the I-frames in the encoded video file) and analyze these image frames to identify the viewable elements being manipulated at that point in the sequence. Moreover, the image frames could be subjected to an optical character recognition (OCR) process to extract any textual context provided in the video. Similarly, a speech-to-text process can be performed to convert the instructor's speech into text, which can likewise be parsed to identify viewable elements to be manipulated, as well as their type of manipulation and their sequence of manipulation, to activate the software operation associated with the help information 160. The help information analysis process 118 is described in greater detail below with reference to FIGS. 10-18.

In the voice command set generation phase 112, the electronic device 100 utilizes the identified viewable element manipulation sequence to generate a voice command set of one or more voice commands that, when vocalized by a user, will trigger the electronic device to emulate the viewable element manipulation sequence to activate an instance of the operation. As part of this process, the electronic device 100 uses descriptive information or other metadata associated with the viewable elements or view screens in the viewable element manipulation sequence to derive a base command syntax for the operation. To illustrate, using the example email composition operation from above, the electronic device 100 may determine a base command syntax of "compose email to <recipient> with subject <subject> and body <body>" based on descriptive terms of "compose", "email", "recipient", "subject", and "body" in metadata associated with the view screens 120, 126, and 142 and the viewable elements 122, 128, 132, 144, and 146. From this base command syntax, one or more voice commands of a voice command set may be generated using variations of terms in the base command syntax, variation in order of terms in the base command syntax, or other variations of the base command syntax.

To illustrate, using known synonyms of the terms, the base command syntax of "compose email to <recipient> with subject <subject> and body <body>" may result in a voice command set including the voice commands of "compose email to <recipient> with subject <subject> and body <body>", "send mail to <recipient> with header <subject> stating <body>", "compose mail for <recipient> with body <body> and subject <subject>", and so forth. The components of the voice commands encased in brackets < > represents variables expected to be supplied by the user as part of the voice command and which are specific to that particular instance of the voice command. For example, to send an email to john.doe@gmail.com with a subject of "dinner reservation", a user may vocalize the command "compose email to john.doe@gmail.com regarding dinner reservation", which could then be parsed as a voice command of "compose email to <recipient="john.doe@gmail.com"> regarding <subject="dinner reservation">". These variables thus are used during the manipulation emulation phase 114 to supply the sought-after input for the corresponding viewable element manipulation (e.g., the input of a character string after "selecting" the to: field 128). The voice command set generation phase 112 is described in greater detail below with reference to FIGS. 4-8.

With the voice command set generated for the software operation, the electronic device 100 is ready to receive voice commands for the software operation at voice command detection phase 113. In this phase, the electronic device 100 monitors for voice input 162 representing an utterance of a voice command from a user. The electronic device 100 then compares the voice input 162 to the voice commands of the voice command set to determine whether there is a sufficient match between the voice input 162 and a voice command of the voice command set. If so, the electronic device 100 enters the manipulation emulation phase 114, whereupon the electronic device 100 emulates the viewable element manipulation sequence determined at phase 111 so as to activate an instance of the software operation. In some embodiments, this process can include injecting user manipulation events into the output of the touchscreen 101 or at outputs of other user input devices so that it appears to the OS and the remainder of the electronic device 100 that the user had tactilely manipulated the user input device in the indicated manner. For example, to emulate a user's tactile contact of a location X of the touchscreen 101, a component of the electronic device 100 may inject signaling at the output of the touchscreen 101 so as to make it appear as though the touchscreen 101 is reporting contact at location X. In other embodiments, the emulation is integrated at the OS or other software level such that the action that otherwise would be triggered by a user's tactile manipulation of a viewable element is instead directly triggered by software without first emulating output from a user input component so as to make it appear that the user had indeed performed the tactile manipulation.

To illustrate using the compose email example above and the example voice command of "compose email to john.doe@gmail.com with subject dinner reservation and stating Please call French Laundry to make a reservation for tonight", the electronic device 100 would emulate the viewable element manipulation sequence thusly: touchscreen contact at a location "A" of view screen 120 (tactile manipulation 124)→touchscreen contact at a location "B" of view screen 126 followed by a character string input of john.doe@gmail.com (tactile manipulation 136)→touchscreen contact at a location "C" of view screen 126 followed by a character string input of "dinner reservation" (tactile manipulation 136)→touchscreen contact at a location "D" of view screen 126 (tactile manipulation 140)→touchscreen contact at a location "E" of view screen 142 followed by a character string input of "Please call French Laundry to make a reservation for tonight" (tactile manipulation 148)→touchscreen contact at location "F" of view screen 142 (tactile manipulation 150). The manipulation emulation phase 114 is described in greater detail below.

Figure 2:
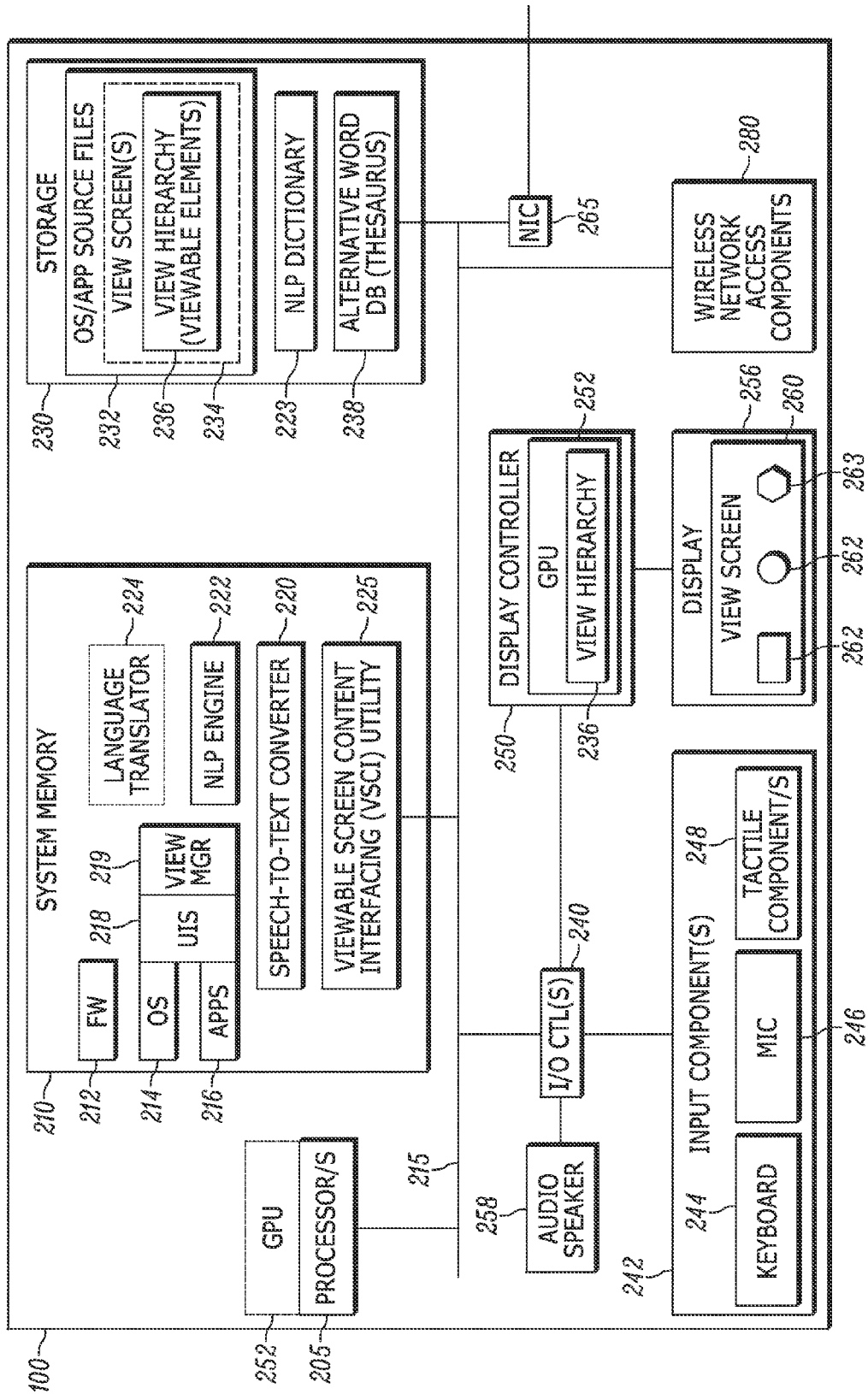
FIG. 2 is a diagram illustrating an example hardware implementation of the electronic device of FIG. 1 in accordance with at least one embodiment of the present disclosure.

FIG. 2 depicts a block diagram representation of an implementation of the electronic device 100 in accordance with at least one embodiment of the present disclosure. In the depicted example, the electronic device 100 includes one or more processors 205 coupled via a system interconnect 215. Also coupled to the system interconnect 215 is a system memory 210 and persistent storage 230, each of which can have an associated controller (not shown). The persistent storage 230 may include, for example, non-volatile memory, hard disc storage, and the like. Following device power-on and during device operation, software and/or firmware modules maintained within the persistent storage 230 can be loaded into the system memory 210 for execution by the one or more processors 205. As shown, the system memory 210 can include a number of software and/or firmware modules including firmware (FW) 212, operating system (OS) 214, and software applications 216. During execution by the one or more processors 205, the OS 214 and the software applications 216 generate GPU instructions for user interfaces, which can be displayed as or within a view screen 260 on a connected display 256. At least some view screens include user-selectable viewable elements 262 such as virtual buttons, virtual keypads, icons, images, and text. As shown, the view screen 260 can also include additional viewable elements 263, which are not user-selectable. In addition to the aforementioned firmware and software, and according to one or more embodiments, the system memory 210 includes a number of additional modules that collectively enable the performance of various aspects of the disclosure. The modules can include a speech-to-text converter module 220, a natural language processing (NLP) engine 222, a language translator 224, and a view screen content interfacing (VSCI) utility 225. The VSCI utility 225 generally represents the dynamic voice command inference functionality of the electronic device 100, and its representative modules are described in detail below with reference to FIG. 3.

While shown as separate modules within the system memory 210, one or more of the above modules can be combined into a single software package or application. For example, the VSCI utility 225 can encompass all functionality of each of the various different modules. The various software and/or firmware modules have varying functionality that are provided when their corresponding program code is executed by the one or more processors 205 or other processing devices within electronic device 100.

Illustrated within the persistent storage 230 are additional modules, including source files 232 for both the OS 214 and the software applications 216. These source files 232 include code for generating view screens 234 and a view hierarchy 236 for each of the view screens 234. The view hierarchy 236 is representative of one or more electronic files that generally include a text representation of selectable and non-selectable viewable elements within a view screen. The view hierarchy 236 may be maintained and updated by a view manager 219, which, as illustrated in FIG. 2, may be implemented in software or alternatively, as hardcoded logic of one of the processors, such as the GPU 252. The storage 230 also includes a NLP dictionary 223 and, in at least one embodiment, an alternative term database 238. The alternative term database 238 can implement a thesaurus database for alternative terms. As will be understood in light of the following disclosure, an alternative term selected from the alternative term database 238 can be a synonym of a received text or word input (e.g., speech converted to text). However, the alternative term can also be an antonym of the received input or an expansion or definition of a coded input or shortened input, such as an acronym or abbreviation, for example.

The electronic device 100 further includes one or more input/output (I/O) controllers 240 which support connection by, and processing of signals from, one or more connected user input components 242, such as a keyboard 244, a microphone 246, and tactile components 248 (e.g., a mouse or the touchscreen 101 of FIG. 2). The I/O controllers 240 also support connection to and forwarding of output signals to one or more connected output components, such as a monitor or display 256 or an audio speaker 258. The display controller 250, which can include a graphical processing unit (GPU) 252, controls access to the display 256. In one or more embodiments, the display controller 250 can be a graphics card with the GPU 252 disposed thereon. However, as further illustrated, in at least one embodiment, the GPU 252 instead may be integrated onto a processor chip or block that includes the one or more processors 205. It is appreciated that the display 256 described within the various embodiments can be a display configured for use as a display peripheral requiring a cable or other form of connection to a separate electronic device that generates or provides the image/screen data for presentation on the display 256. Alternatively, the display component can be an integral part of the actual electronic device, such as a liquid crystal display (LCD) screen utilized with tablet computers, smartphones, and single integrated personal computing systems.

The electronic device 100 further has a network interface component (NIC) 265 that enables electronic device 100 to communicate or otherwise interface with other devices, services, and components that are located external to electronic device 100. These devices, services, and components can interface with the electronic device 100 via an external network, such as a local area network (LAN) or a wide area network (WAN)(e.g., the Internet), using one or more communication protocols. The electronic device 100 can also include one or more wireless network access components 280 that enable the electronic device 100 to communicate with one or more wireless networks. Examples of such wireless network access components 280 include a wireless local area network (WLAN) access point, a Bluetooth™ transceiver, an infrared transceiver, a near field communications (NFC) transceiver, and the like.

Figure 3:
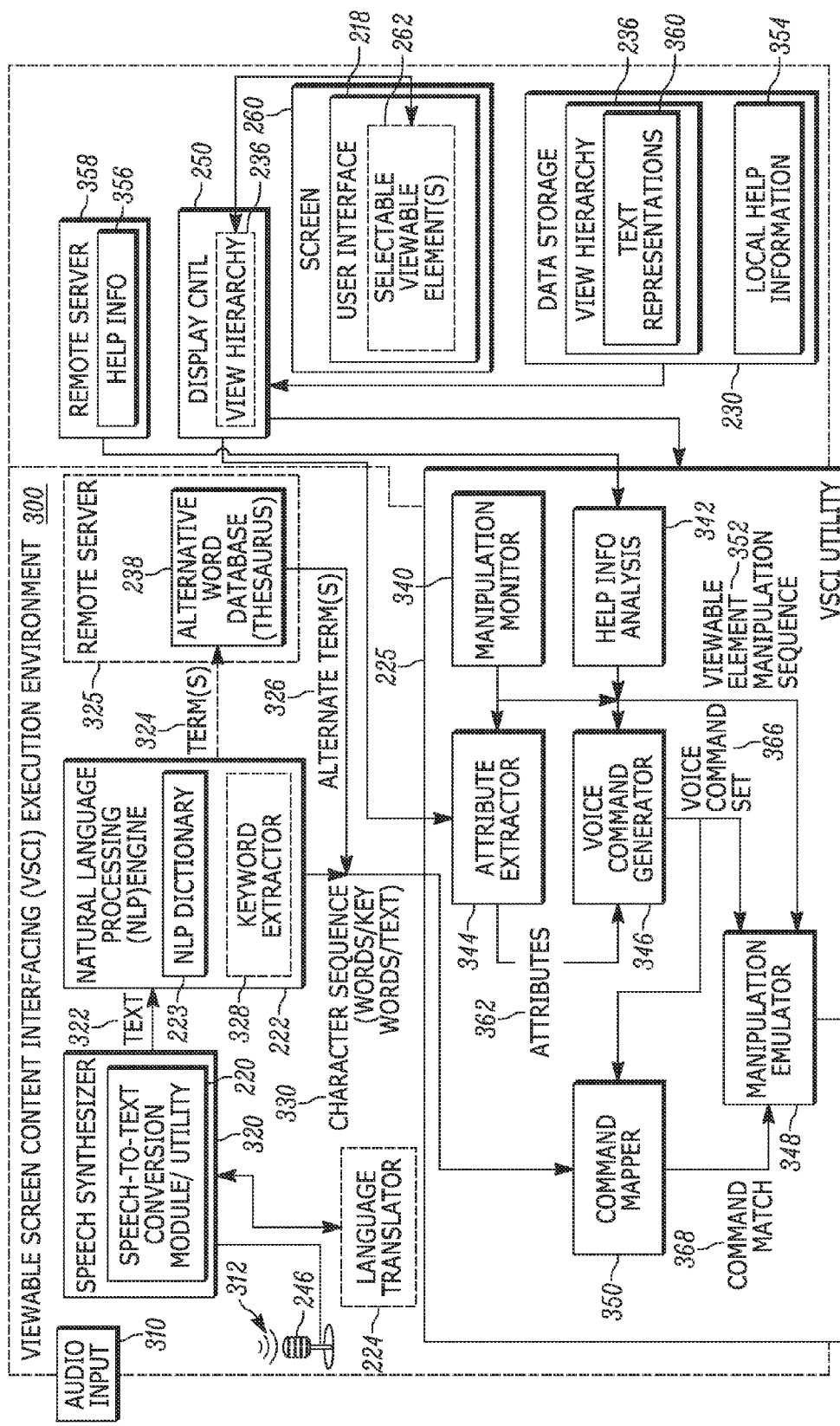
FIG. 3 is a diagram illustrating an example system implementation of the electronic device of FIG. 1 in accordance with at least one embodiment of the present disclosure.

FIG. 3 illustrates an example implementation of a VSCI execution environment 300, within which the various functional features of the disclosure can be implemented. The VSCI execution environment (VSCI EE) 300 includes several of the components previously introduced in FIG. 2 interconnected with directional arrows. These directional arrows are provided to identify generally the directional flow of input data, operational code, communication between components, and processing sequence, according to the example implementation. It is appreciated that different sequencing of the processes can be implemented in alternative embodiments, including omission of some sequencing steps and addition of other sequencing steps.

As shown at the top left corner, VSCI EE 300 receives audio input 312 (one embodiment of voice input 162 of FIG. 1) from an audio input source 310, which represents a user who utters a term, phrase, or sentence that can be captured by an audio input component associated with the electronic device 200 that supports VSCI EE 300. Audio input 312 is received by microphone 246, generally representative of an example audio input component.

Received speech input is forwarded to a speech synthesizer 320, which can include the speech-to-text converter module 220. The speech-to-text converter module 220 can be communicatively linked or associated with language translator 224. When the received speech input is of a different language than a native language in which the VSCI EE 300 processes its downstream operations, as determined by a language identification utility (not shown), the speech-to-text converter module 220 accesses language translator 224 to obtain a translation of the received speech input into the native language of the VSCI EE 300 before completing conversion of the received speech input into text. The speech synthesizer 320 generates text 322 as its output and that output is forwarded to the NLP engine 222. The NLP engine 222 searches within NLP dictionary 223 for identifiable words, phrases, or text sequences that are similar to text 322 received as input. In one or more embodiments, the NLP engine 222 includes keyword extractor module 328, which can extract one or more keywords from received input text 322 containing multiple words or distinct text sequences. In one or more embodiments, the keyword extractor module 328 can eliminate connecting words, such as "and" or "or" and/or can remove articles, such as "the" and "an" and/or other common words, from a longer list of words or text sequences.

In some embodiments, the terms or text sequences 324 identified by the NLP engine 222 can be forwarded to the alternative term database 238 to identify synonyms commonly associated with an identified word from the received input text. The alternative term database 238 then provides one or more alternative terms 326 to be utilized, in addition to the identified terms, as a character sequence 330 that is inputted to the VSCI utility 225. In one alternative embodiment, the VSCI utility 225 forwards the character sequence to the alternative term database 238 only when no matching text representation can be found within the view hierarchy 236. In one embodiment, the alternative term database 238 may be implemented at a remote server 325, and access to the alternative term database 238 in this instance also may also be supported within VSCI EE 300.

As illustrated, a character sequence 330 that is determined (at the NLP dictionary 223) is forwarded to VSCI utility 225, which includes functional modules for performing processes for voice command inference and viewable element manipulation emulation as described later in more detail. To this end, the VSCI utility 225 includes a manipulation monitor module 340, a help information analysis module 342, an attribute extractor module 344, a voice command generator module 346, a manipulation emulator module 348, and a command mapper module 350. In the event that the VSCI utility 225 is implementing the manipulation monitoring process 116 (FIG. 1) to determine a viewable element manipulation sequence, it is the manipulation monitor module 340 that generates a viewable element manipulation sequence 352 from monitoring a user's interaction with the electronic device 100 via the user input components 242. Alternatively, in the event that the VSCI utility 225 is implementing the help information analysis process 118 (FIG. 1), it is the help information analysis module 342 that generates the viewable element manipulation sequence 352 through analysis of help information associated with the corresponding software application. This help information may include, for example, locally-stored help information 354 (e.g., stored in persistent storage 230) and which takes the form of a data file or other data structure embedded with, or otherwise integrated with, the software application. Alternatively, the help information may include help information 356 accessed from a remote server 358, such as a help webpage or streaming help video accessed from the remote server 358 via the Internet.

Both processes 116 and 118 rely on identification of viewable elements in view screens associated with the one or more software applications that perform the corresponding operation. The user manipulation monitor module 340 identifies the user-selectable viewable elements manipulated by a user to actuate the operation, and from these identified viewable elements and their sequence of manipulation derives the viewable element manipulation sequence 352. The help information analysis module 342 identifies the user-selectable viewable elements referenced in the analyzed help information, and the order of their reference and manner in which their manipulation is described, to derive the viewable element manipulation sequence 352. Thus, to facilitate identification and analysis of the viewable elements, in at least one embodiment, VSCI utility 225 retrieves, from the view manager 219 (FIG. 2), an electronic file containing the text-representation of a layout of at least the selectable viewable elements 262 being presently displayed on the view screen 260. The GPU 252 loads the electronic file of the view hierarchy 236 from storage 230 prior to generating the user interface 218 presented within screen 260. As shown, included within or associated with the view hierarchy 236 are text representations 360 describing each viewable element presented on screen 260 as well as the location and properties of those viewable elements. The view manager 219 then forwards the text representations 360 to either the user manipulation monitor module 340 or the help information analysis module 342, depending on the mode of viewable element manipulation sequence generation, for use in generating the viewable element manipulation sequence 352 using the techniques described below.

The viewable element manipulation sequence 352 is forwarded to the attribute extractor module 344, the voice command generator module 346, and the manipulation emulator module 348. The attribute extractor module 344 uses the metadata and other text representations for the viewable elements in the viewable element manipulation sequence 352 to determine one or more pertinent attributes 362 for the viewable elements, such as descriptive attributes for the actions taken in response to the user's manipulation of the viewable elements of the viewable element manipulation sequence 352. From the attributes 362 and the sequence of manipulations represented in the viewable element manipulation sequence 352, the voice command generator module 346 generates a voice command set 366 that includes one or more voice commands that can be used to trigger the activation of the software operation by the VSCI utility 225. This voice command set 366 is then made available to the command mapper module 350.

The command mapper module 350 monitors the user's voice input via the character sequences 330 generated from user voice input to determine whether a voice input from the user represents one of the voice commands in the voice command set 366. To this end, the command mapper module 350 compares the character sequence 330 to the voice commands of the voice command set 366 to determine whether there is a sufficient match. If there is a sufficient match, the command mapper module 350 signals a command match 368 to the manipulation emulator module 348. In response to the command match 368, the manipulation emulator module 348 performs an emulation 370 of the viewable element manipulation sequence 352. This emulation may be performed by injecting emulated tactile manipulations into the outputs of the user input components 242 such that the emulation is transparent to the OS 214 and software application 216, or by directly signaling the tactile manipulation to the OS 214 or software application 216. In at least one embodiment, the voice commands may include variables that are specific to an instance of the voice command (such as identifying the destination email address in a voice command for composing an email), and thus the manipulation emulator module 348 may identify the corresponding variables from the character sequence 330 and provide representations of these variables as emulated user tactile input at the appropriate points in the emulated sequence of tactile manipulations. These processes are described in detail below.

Figure 4:
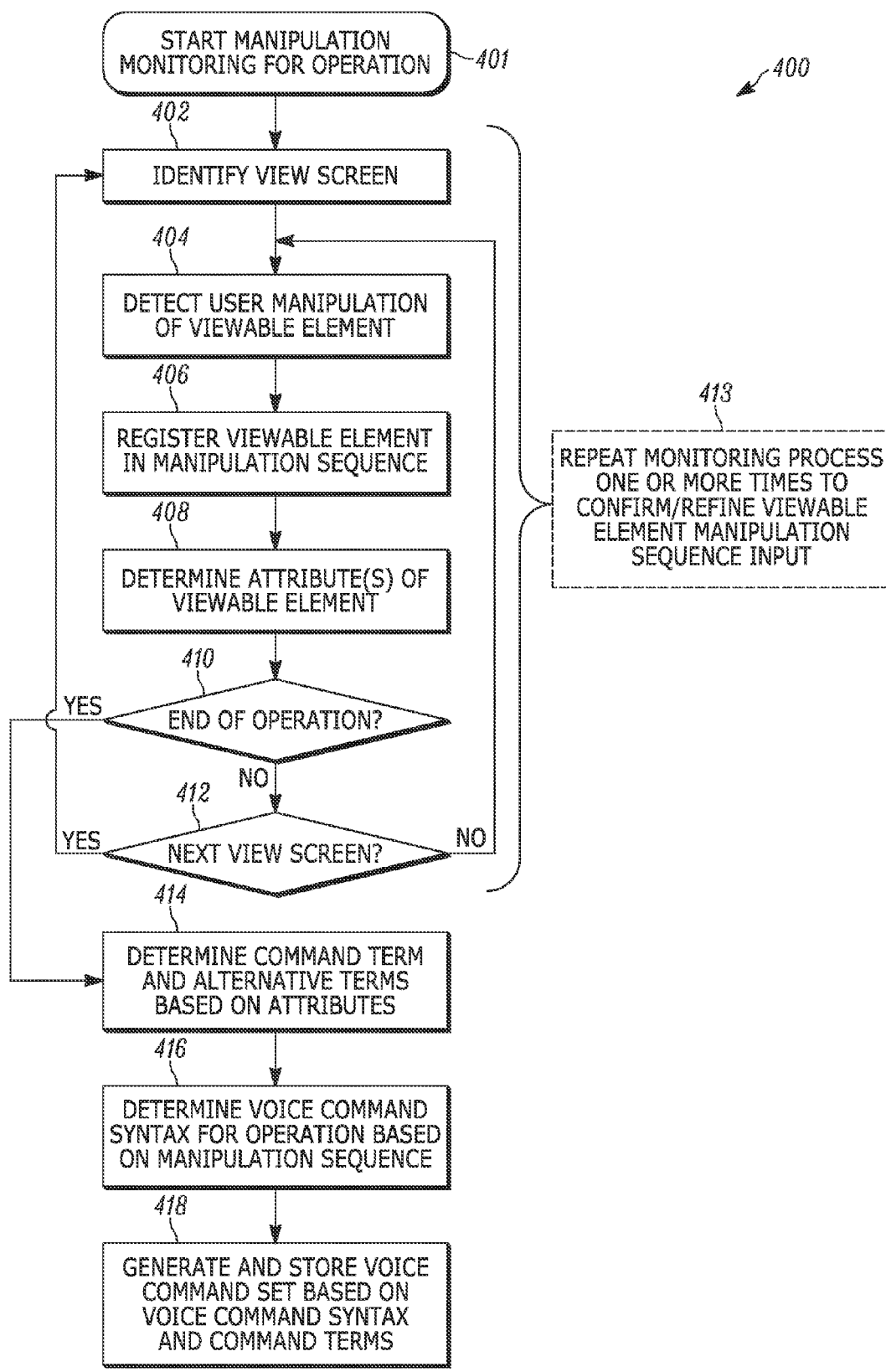
FIG. 4 is a flow diagram illustrating a method for dynamically inferring a voice command set and corresponding viewable element manipulation sequence for an operation of a software application at an electronic device through monitoring of a user's tactile manipulation of viewable elements to actuate an instance of the operation in accordance with at least one embodiment of the present disclosure.

FIG. 4 illustrates a method 400 for implementing the manipulation monitoring process 116 (FIG. 1) for dynamically inferring a voice command set and corresponding viewable element manipulation sequence for a software operation contained within a single software application 216 (FIG. 2) in accordance with at least one embodiment. For ease of illustration, the method 400 is described in the example context of the implementation of the electronic device 100 described above with reference to FIGS. 2 and 3. Moreover, the flowchart of FIG. 4 has been simplified for ease of understanding. While a particular sequence of steps is described, individual steps may be re-ordered, repeated, or omitted depending on implementation or design goals.

The method 400 is initiated in response to a trigger 401 indicating that the user has, or shortly will be, manipulating the electronic device 100 to perform a specific software operation. Thus, the trigger 401 may include, for example, user manipulation that triggers the execution of the software application 216, user manipulation that initiates a pre-identified operation of interest, and the like. For example, the VSCI utility 225 may ascertain that it is missing a voice command set for operations pertaining to a specific software application, and thus when the user selects an icon for the software application to trigger its execution, the VSCI utility 225 may begin monitoring the user's manipulations. As another example, the VSCI utility 225 may ascertain that it does not have a voice command set for a user-selectable viewable element found at the main screen of a software application, and thus when the user manipulates this viewable element the VSCI utility may take the opportunity to develop an operation associated with the viewable element and thus may begin monitoring the user's manipulations. In yet another embodiment, the VSCI utility 225 may continuously monitor the user's manipulations of viewable elements, and analyze the stream of viewable element manipulations to identify a particular sequence that is repeated with some frequency by the user, and from this identify the particular sequence of viewable element manipulations as being a distinct software operation.

Oftentimes, a software operation will involve the user navigating a sequence of view screens presented by the software application 216 or the OS 214. Accordingly, at block 402 the manipulation monitor module 340 interfaces with the display controller 250 and the view hierarchy 236 to identify the current view screen 260 presented to the user by the software application 216 or OS 214. At block 404 the user manipulation monitor module 340 determines, through monitoring of the user input components 242, that the user has provided tactile manipulation of a viewable element, and thus the user manipulation monitor module 340 interfaces with the display controller 250 and the view hierarchy 236 to identify the viewable element manipulated by the user and the manner in which it was manipulated. To illustrate, to select a clickable icon presented in the current view screen 260 a user may touch the touchscreen 101 (FIG. 1) at a location (X,Y). The user manipulation monitor module 340 may receive this location (X,Y) from the touchscreen 101 and access the view hierarchy 236 to identify the viewable element associated with location (X,Y) in the current view screen 260. In addition to identifying the viewable element itself, the user manipulation monitor module 340 may determine the type of viewable element (e.g., a "clickable" icon, a pull-down list, a character input field, etc.) and the manner in which the user manipulated the viewable element (e.g., through touching a particular point on the touchscreen 101, through input of a character string through a physical or virtual keyboard, through positioning a cursor at a particular location and then enacting a left mouse click or right mouse click, etc.).

At block 406, the user manipulation monitor module 340 registers the viewable element manipulation detected at block 404 in a viewable element manipulation sequence 352 being constructed for the software operation currently being performed by the user. The viewable element manipulation may be registered as the particular tactile manipulation detected (e.g., user contact with location (X,Y) of the touchscreen) and assigned a sequence number that reflects its location in the order in which the user manipulates viewable elements to actuate the software operation. Further, other features of the viewable element, such as its type, identifier, or other metadata, as well as other information regarding its manipulation, such as an indication that the user has input a variable as part of the manipulation, may be registered with the viewable element manipulation.

At block 408, the attribute extractor module 344 determines one or more attributes of the viewable element for use in identifying an action or other role of the viewable element in the software operation. In at least one embodiment, the attributes for the viewable element can include descriptive attributes obtained from a text description of the viewable element accessed, via the view manager 219 or the GPU 252, by the attribute extractor module 344 from the text representations 360 of the view hierarchy 236. For example, an email application may include a "compose email" icon on its main screen and which is used to initiate an email composition process. The email application may provide metadata for this compose email icon that has text description of the icon as "compose email", and from this the attribute extractor module 344 may identify the viewable element as having the descriptive attributes of "compose" "email" and "compose email".

At block 410, the user manipulation monitor module 340 determines whether the user's manipulation of the viewable element detected at block 404 represents the end of the operation being enacted by the user. The end of the operation may be signaled by the exiting, suspension, or termination of the execution of the software application 216, by the transition between view screens without user prompting (e.g., when a display screen providing a confirmation that an email has been successfully transmitted after the user selects a "send mail" icon), the transition back to the main screen or other view screen of the OS, or when the selected viewable element has indicia of the last action of an operation, such as being associated with metadata with descriptions like "send", "end", "exit", and the like.

Depending on the structure of the view screens and the software operation, a particular view screen may have multiple viewable elements that are manipulated by the user. To illustrate, a view screen used to compose an email may have multiple input fields for the destination addresses, any cc: addresses, a subject, a message body, icons to change the priority of the email, icons to modify the formatting, and the like. Accordingly, if the manipulation monitor module 340 does not detect an end of the operation at block 410, at block 412 the manipulation monitor module 340 determines whether the user's manipulation of the viewable element as detected at block 404 has triggered the software application 216 to present a different view screen. If so, method 400 returns to block 402 to identify the next view screen and continue monitoring for user manipulation of one or more viewable elements in the next view screen. Otherwise, if the software application 216 has remained on the same view screen after the user's manipulation of the viewable element, the method 400 returns to block 404 to continue monitoring for user manipulation of one or more viewable elements in the same view screen.

Returning to block 410, if the end of the operation is detected, the method 400 proceeds to the voice command set generation phase 112 (FIG. 1). However, as represented by block 413, before initiating voice command generation, the VSCI utility 225 may elect to monitor one or more additional iterations of the user's performance of the software operation in order to confirm that the viewable element manipulation sequence 352 identified for the software operation is accurate, or to identify any variations in the viewable element manipulation sequence 352 that may result in activation of the same software operation (e.g., in some instances the user may fill in the body field of an email message before filling in the to: field, and in other instances the user may fill in the to: field before filling in the body field). Moreover, though one or more monitoring iterations, the VSCI utility 225 may identify which viewable element manipulations are required to actuate the corresponding software operation, and which viewable element manipulations (if any) are optional. For example, to compose a text message, the user's manipulation of a "compose message" icon may be required for the text message composition operation, but input of destination address in a cc: field may be identified as an optional manipulation as a result of its absence from one or more monitored iterations.

After performing one or more iterations of the process represented by blocks 402-412, the method 400 transitions to the voice command set generation phase 112. It will be appreciated that the viewable element manipulation sequence 352 represents a series of command actions and their corresponding inputs within the software operation represented by the viewable element manipulation sequence 352. To illustrate, selection of a "compose message" icon in a text messaging application represents the command action of "compose a text message", selecting a to: field and inputting another user's address X represents the command action of "identify the recipient as X", and selecting a message body field and inputting a character string Y represents the action of "identify the body of the message as Y." Accordingly, at block 414 the voice command generator module 346 uses the viewable element manipulation sequence 352 and attribute metadata generated at blocks 402-412 to identify these command actions and determine one or more command terms representative of the command actions and likely to be spoken by a user when issuing a voice command for the software operation.

To illustrate using the example above, the viewable element manipulated by the user to initiate text message composition may have descriptive text metadata of "send message" and thus the base command term for initiating composition of a text message would be "send message". The viewable element manipulated by the user to input the destination address may have descriptive text metadata of "to:" and thus the base command term for inputting the destination address could be identified as "to". The viewable element manipulated by the user to input the message body may have descriptive text metadata of "message statement" and thus the base command term for inputting the message body could be identified as "statement" (with the "message" term component being identified as non-descriptive in this example and thus ignored by the attribute extractor module 344).

As most languages use multiple words that have very similar meanings, in some embodiments, the base command terms identified by the attribute extractor module 344 can be forwarded to the alternative term database 238 to identify synonyms commonly associated with each identified command term, these synonyms being identified herein as "alternative terms" relative to the base command terms. To illustrate, a base term of "compose" may be identified as having alternative terms of "send", "prepare", "create", or "generate." Likewise, the command term "to" may have the alternative term of "for".

With the viewable element manipulation sequence 352 and the command terms, at block 416 the voice command generator module 346 determines a voice command syntax representing the operation. The voice command syntax provides a basic representation of how the user may describe the actions, the variables associated with the command actions, and their order when giving a voice command representing the action. As described above, the command actions are identified from the descriptive metadata determined for the manipulated viewable elements, the inputs are identified from the viewable element type (e.g., "clickable", character string input, check-box, and the like), and the basic sequence is identified from the order of manipulation in the viewable element manipulation sequence 352. To illustrate using the text messaging example above, a voice command syntax may be identified as "compose message to <destination address> stating <message body>".

At block 418, the voice command generator module 346 generates the voice command set 366 from the voice command syntax, the command terms, and their alternative terms. The voice command set 366 includes one or more voice commands that may be spoken by the user to activate the software operation. To this end, voice commands may be generated based on permutations of the voice command syntax and the alternative terms for the command terms in this voice command syntax. For example, with alternative terms of "send" or "prepare" for the command term "compose" and alternative term of "saying" for the command term "stating", the voice command set 346 generated from the base voice command syntax "compose message to <destination address> stating <message body>" could include: (1) "compose message to <destination address> stating <message body>"; (2) "send message to <destination address> stating <message body>"; (3) "send message to <destination address> saying <message body>"; (4) "compose message to <destination address> saying <message body>"; (5) "prepare message to <destination address> stating <message body>"; and (6) "prepare message to <destination address> saying <message body>".

Moreover, the voice command generator module 346 may coordinate with NLP engine 222 to identify alternative sequences that the user may vocalize for the terms for the same command. For example, while the base voice command syntax may be predicated on the user specifying the destination address for a text message, a user may instead specify the destination address after the message body. Thus, the voice command generator module 346 may generate voice commands based on these alternative sequences of command actions. For example, the base voice command syntax of "compose message to <destination address> stating <message body>" may be rearranged in a voice command of the voice command set 366 as "compose message stating <message body> for <destination address>". The process of generating alternative voice commands for the voice command set 366 based on alternative terms within this rearranged sequence likewise may be performed.

The voice command generator module 346 then stores the generated voice command set 366 at the electronic device 100 for use by the command mapper module 350 when processing user voice input for detection of potential voice commands. The voice command set 366 may be stored in, for example, system memory 210 (FIG. 2) or persistent storage 230 (FIG. 2), and may be represented by any of a variety of data structures, or combinations of data structures. To illustrate, each voice command of the voice command set 366 may be stored as a separate entry within a voice command table. Alternatively, the base voice command syntax and its alternative arrangements each may be stored as a separate entry, and the alternative terms for the command terms in the base voice command syntax and its alternative arrangements (including identifying which, if any, command terms represent optional user manipulations) may be stored as separate tables that are referenced when the command mapper module 350 is analyzing a selected base voice command syntax.

Figure 5:
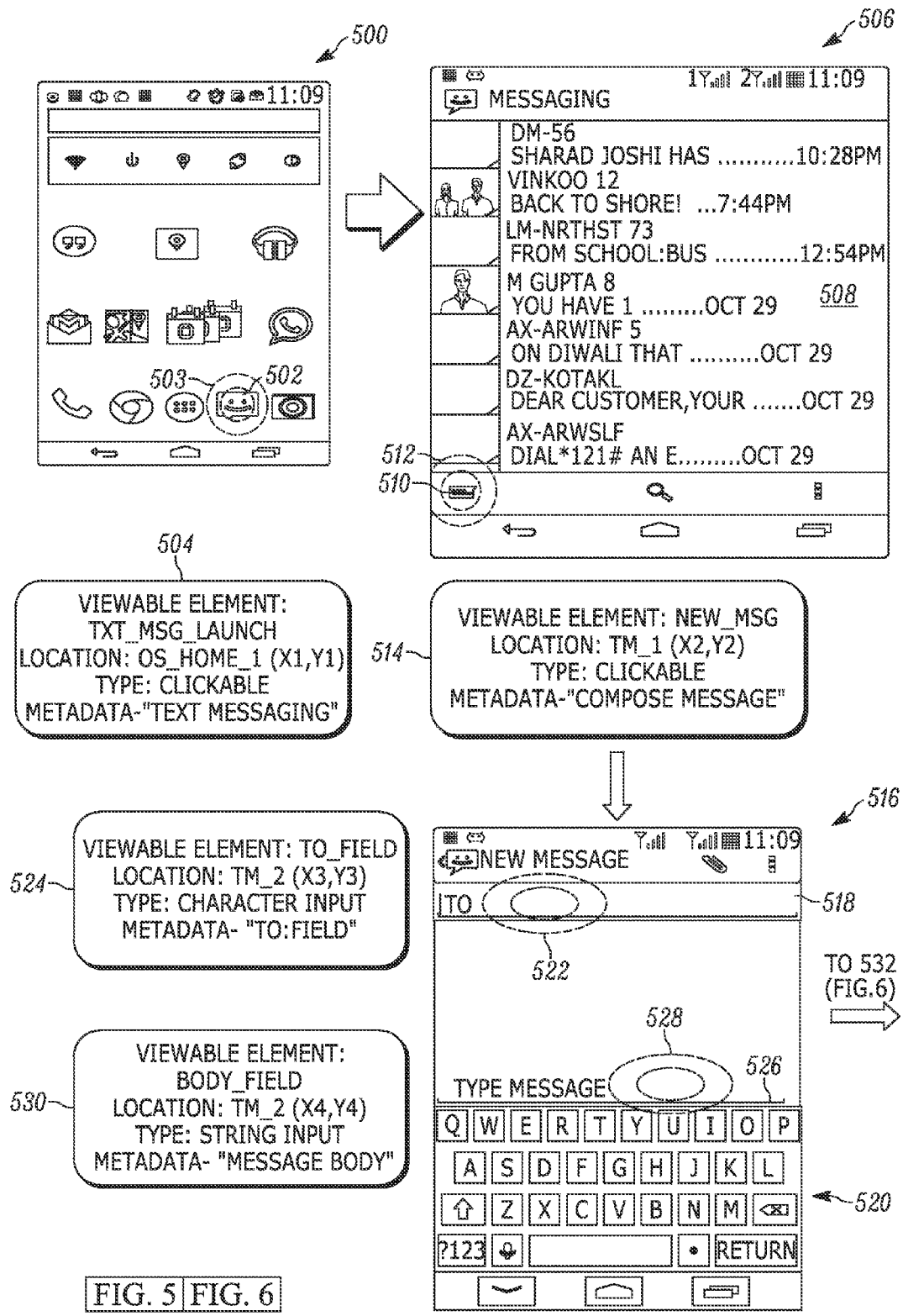
FIGS. 5 and 6 are diagrams illustrating an example of the method of FIG. 4 in accordance with at least one embodiment of the present disclosure.
Figure 6:
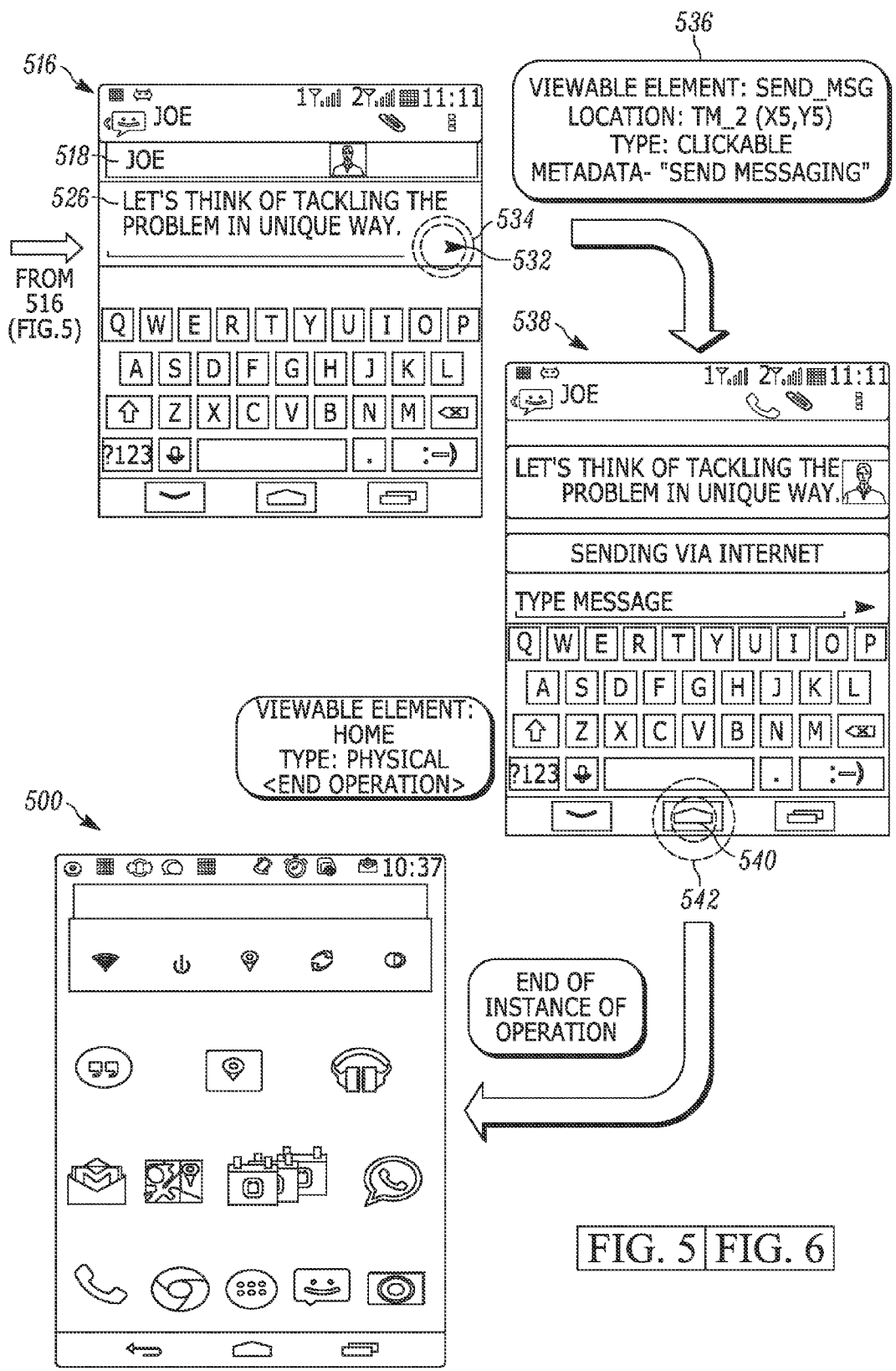

FIGS. 5 and 6 illustrate a particular example of the manipulation sequence inference phase 111 and the voice command set generation phase 112 as represented by method 400 of FIG. 4 in accordance with at least one embodiment. For the following, the software operation is an operation to compose and send a text message. Initially, the OS 214 provides for display a view screen 500 representing a main, or "home," screen (identified as view screen "OS_Home_1") of the OS 214. As shown, the view screen 500 includes a matrix of icons, each icon representing a corresponding software application that is launched by the OS 214 when the user touches a location on the touchscreen 101 corresponding to range of locations associated with the icon. An icon 502 represents a text messaging application, and thus when a user touches the touchscreen 101 at a location (X1, Y1) (tactile manipulation 503) within the range associated with the icon, the OS 214 initiates execution of the text messaging application. The manipulation monitor module 340 detects the tactile manipulation 503, and in response the attribute extractor module 344 accesses the view hierarchy 236 to identify the manipulated viewable element (identified as "TXT_MSG_LAUNCH"), its metadata (the text description "Text Messaging"), and the manner in which it was manipulated ("clickable"). From this information, the manipulation monitor module 340 generates an initial entry 504 in a viewable element manipulation sequence.

When launched, the text messaging application presents a view screen 506 representing a main screen of the text messaging application (identified as view screen "TM_1"). In this example, the main screen presents a list 508 of recent contacts and a "compose text" icon 510. The user "clicks" the icon 510 by contacting the touchscreen 101 at a location (X2, Y2) corresponding to a location within a range of locations associated with the icon 510 (identified as tactile manipulation 512). The manipulation monitor module 340 detects the tactile manipulation 512, and in response the attribute extractor module 344 accesses the view hierarchy 236 to identify the manipulated viewable element (identified as "NEW_MSG"), its metadata (the text description "New Message"), and the manner in which it was manipulated ("clickable"). From this information, the manipulation monitor module 340 generates a second entry 514 in the viewable element manipulation sequence.

The user's manipulation 512 of the icon 510 triggers the text messaging application to present a view screen 516 representing a compose message screen (identified as view screen "TM_2"). When presented with this view screen 516, the user touches a location (X3,Y3) on the touchscreen 101 corresponding to a location within a range of locations associated with a to: field 518 and then uses a virtual keyboard 520 in the view screen 516 to enter a destination address (this combination of manipulations being identified as tactile manipulation 522). The he manipulation monitor module 340 detects the tactile manipulation 522, and in response the attribute extractor module 344 accesses the view hierarchy 236 to identify the manipulated viewable element (identified as "TO_FIELD"), its metadata (the text description "To: field"), and the manner in which it was manipulated (character string input). From this information, the manipulation monitor module 340 generates a third entry 524 in the viewable element manipulation sequence.

After manipulating the to: field 518, the user touches a location (X4,Y4) of the touchscreen 101 corresponding to a location within a range of locations associated with a body: field 526 and then uses the virtual keyboard 520 to enter a message body (this combination of manipulations being identified as tactile manipulation 528). The he manipulation monitor module 340 detects the tactile manipulation 528, and in response the attribute extractor module 344 accesses, via the GPU 252, the view hierarchy 236 to identify the manipulated viewable element (identified as "BODY_FIELD"), its metadata (the text description "Type Message"), and the manner in which it was manipulated (character string input). From this information, the manipulation monitor module 340 generates a fourth entry 530 in the viewable element manipulation sequence.

After composing the message body, the user touches a location (X5,Y5) of the touchscreen 101 corresponding to a location within a range of locations associated with a "send message" icon 532 of the view screen 516 (tactile manipulation 534). The tactile manipulation 534 is detected by the manipulation monitor module 340, and in response the attribute extractor module 344 accesses the view hierarchy 236 to identify the manipulated viewable element (identified as "SEND_MSG"), its metadata (the text description "Send Message"), and the manner in which it was manipulated (clickable). From this information, the manipulation monitor module 340 generates a fifth entry 536 in the viewable element manipulation sequence.

The user's manipulation of the send message icon 532 triggers the text messaging application to generate and transmit a text message to the destination address supplied in the to: field 518 and with the message body supplied in the body field 526. As a result of successful transmission of the text message, the text messaging application presents a view screen 538 that shows the text message as being sent. The user thus presses a "home" physical button 540 on a casing of the electronic device 100 (tactile manipulation 542), which triggers the OS 214 to terminate or suspend the text messaging application and return to presenting the OS main screen (view screen 500). The manipulation monitor module 340 detects the tactile manipulation 542, and from its nature (terminating or suspending the text messaging application), the manipulation monitor module 340 determines that the current instance of the software operation has ended and thus ceases monitoring for user tactile manipulations for the software operation.

Thus, with the termination of the operation, the manipulation monitor module 340 has generated a viewable element manipulation sequence having the sequence of manipulation entries 504, 514, 524, 530, and 536. This manipulation sequence may be generally represented the sequence: "contact at location (X1,Y1) at view screen OS_HOME_1"→contact at location (X2,Y2) at view screen NEW_MSG→contact at location (X3,Y3) at view screen TM_2→character string input→contact at location (X4,Y4) at view screen TM_2→character string input→contact at location (X5,Y5)". Similarly, a text description of the viewable elements manipulated in this sequence may be generally represented as "text messaging"→"new message"→"to"<destination address>→"message body"→<message body>." From this, the voice command generation module 346 may determine a base voice command syntax of "new text message to <destination address> with body <message body>". The voice command generation module 346 also may interact with one or both of the alternative term database 238 or the NLP dictionary 223 to identify alternative terms for the command terms, such as by identifying "compose" and "draft" as alternative to the command term "new" and identifying "stating," "reading," or "saying" as alternatives to the command term "with body". From various permutations of this base voice command syntax and these alternative terms, the voice command generation module 346 may determine a voice command set of: (1) "new text message to <destination address> with body <message body>"; (2) "compose text message to <destination address> with body <message body>"; (3) "draft text message to <destination address> with body <message body>"; (4) "draft text message to <destination address> stating <message body>"; (5) "compose text message to <destination address> saying <message body>", etc.

A software operation activated by a user may span multiple software applications. To illustrate, a user may capture a picture using a camera application and then share the picture with other users using a social media application. In the event that the software applications involved in the software operation do not vary, then the process described above with reference to method 400 of FIG. 4 can suffice to accurately capture and characterize a voice command set and viewable element manipulation sequence for the software operation, even though two or more software applications are involved. However, in some instances, the user may select from a plurality of alternative software applications to fulfil one or more actions within the software operation as a whole. To illustrate, after capturing the picture with the camera application, the user may have the option to share the picture using any of a plurality of social media applications at the electronic device 100. Although a separate viewable element manipulation sequence and voice command set could be determined for each permutation of the camera application and a corresponding one of the social media applications, this would require that an instance of the user enacting the software operation with the corresponding combination of camera application and social media application. If the user rarely uses a particular social media application, the VSCI utility 225 very likely would not be able to support voice command functionality for that particular social media application.

Figure 7:
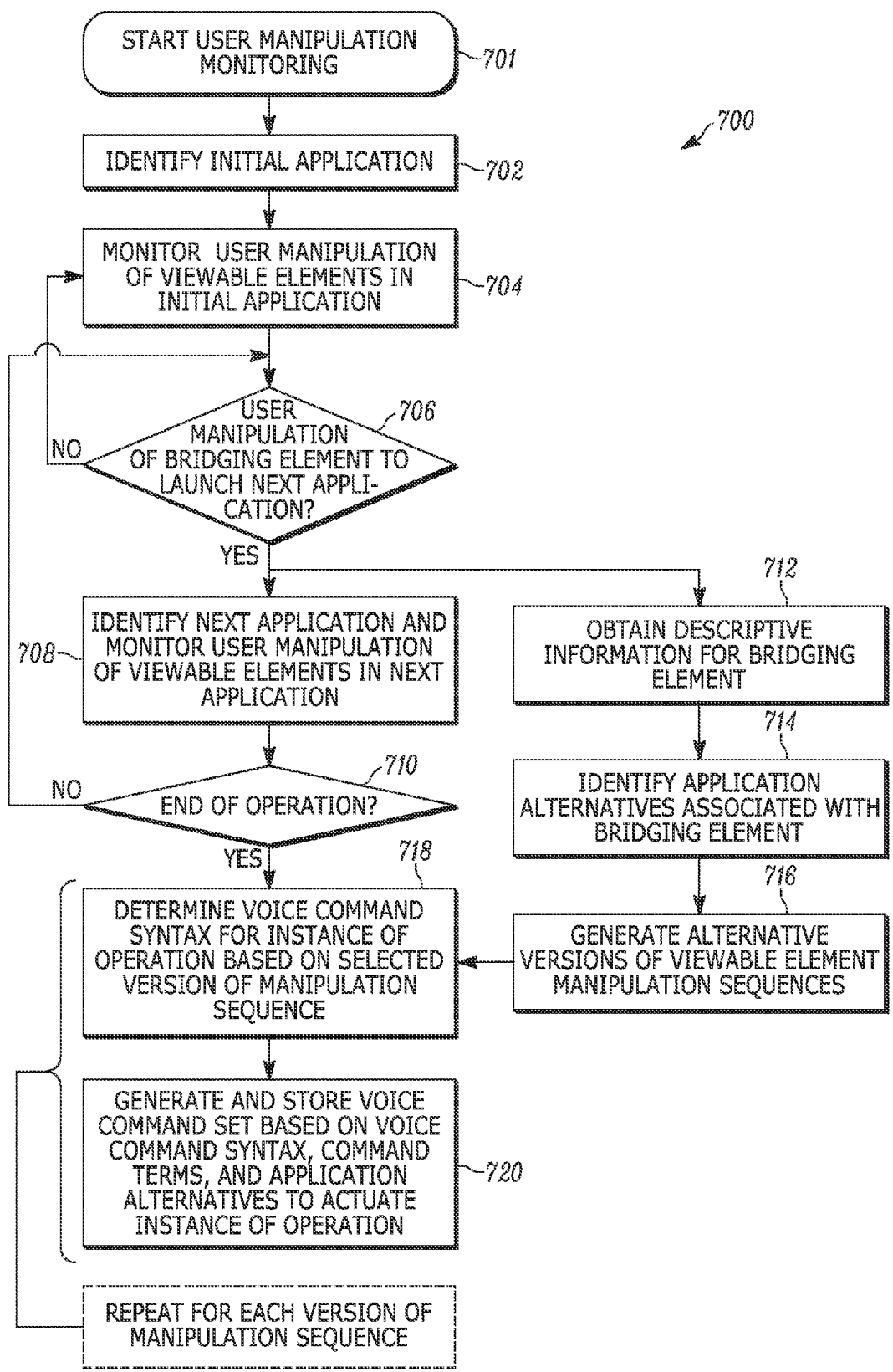
FIG. 7 is a flow diagram illustrating a method for dynamically inferring a voice command set and corresponding viewable element manipulation sequence for an operation that spans multiple software applications at an electronic device through monitoring of a user's manipulation of viewable elements in accordance with at least one embodiment of the present disclosure.
Figure 8:
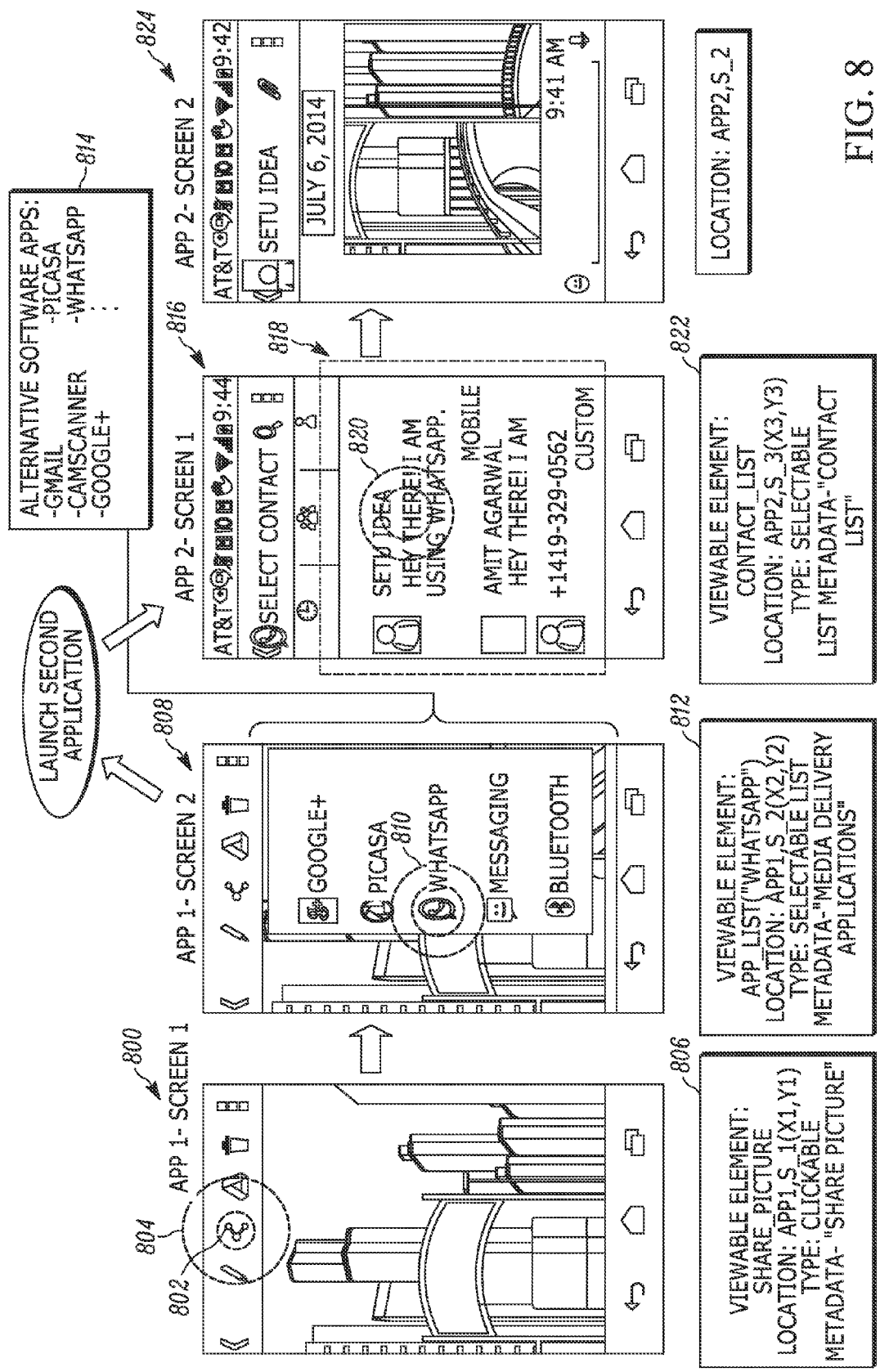
FIG. 8 is a diagram illustrating an example of the method of FIG. 7 in accordance with at least one embodiment of the present disclosure.
Figure 9:
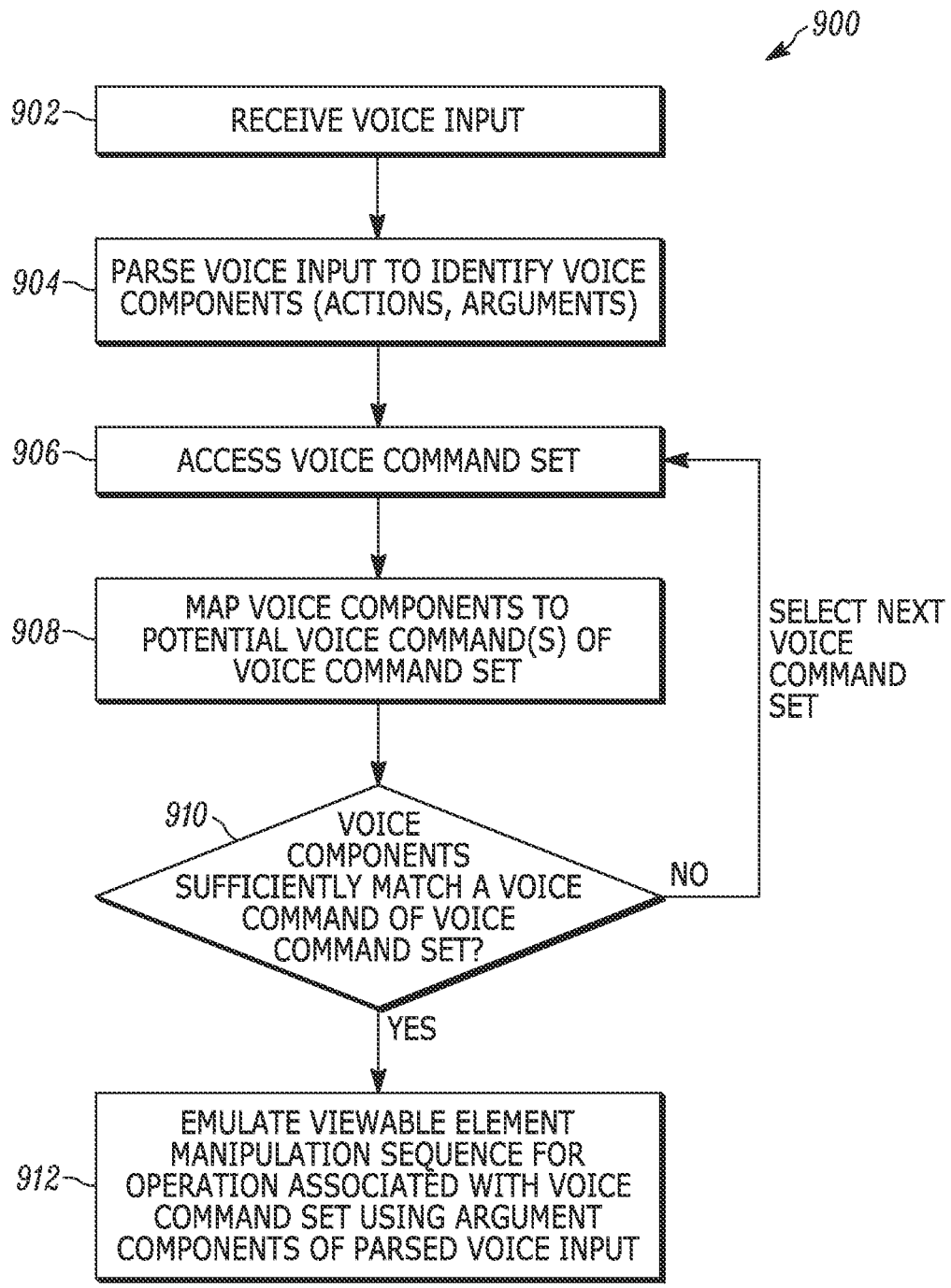
FIG. 9 is a flow diagram illustrating a method for performing an emulation of a viewable element manipulation sequence to enact an instance of an operation for one or more software applications at an electronic device in response to a voice command from a user in accordance with at least one embodiment of the present disclosure.

FIGS. 7-9 illustrate a method 700 and corresponding example for determining a voice command set and viewable element manipulation sequence for a software operation that spans multiple software applications and which may have multiple options for fulfilling one or more actions using different software applications. The flowchart of FIG. 7 has been simplified for ease of understanding. While a particular sequence of steps is described, individual steps may be re-ordered, repeated, or omitted depending on implementation or design goals.

The method 700 initiates at block 701 with the detection of a trigger that indicates that the user has begun using the electronic device 100 to activate a software operation, as discussed previously with respect to block 401 of method 400 of FIG. 4. In this case, the software operation spans multiple software applications, and thus at block 702 the manipulation monitor module 340 identifies the initial software application involved with the software operation. The initial software application may be identified via, for example, the icon manipulated by the user to initiate or resume execution of the software application. At block 704, the manipulation monitor module 340 monitors the user's manipulation of viewable elements in the initial software application and registers detected viewable element manipulations in a viewable element manipulation sequence as described above with reference to blocks 402-413 of method 400.

The transition between one software application and the next software application for a given operation typically is triggered by the user manipulating a bridging element that represents this transition. The bridging element is a viewable element displayed in the context of one software application that alerts the user to the option to use another software application for some functionality related to the functionality currently provided in the initial software application. In some embodiments, this bridging element is provided within the framework of the OS 214. To illustrate, when the OS 214 detects that a media file is involved in a user's current interactions with a software application, the OS may display a "share" icon that, when selected by the user, triggers the OS 214 to present a view screen with a menu of one or more software applications capable of transmitting the media file to other users or storing the media file at a remote destination. In other embodiments, the bridging element is provided within the framework of the current software application. To illustrate, the software application may be one of a suite of interrelated software applications, and the involvement of, for example, a media file may trigger the initial software application to present a share icon that can be selected by the user to present icons for one or more other software applications of the suite that can provide further functionality with respect to the media file. In either example, the "share" icon and subsequent menu separately or together may constitute bridging elements between the initial software application and the next software application.

As manipulation of a bridging element signals the transition between software applications within an operation being performed, at block 706 the manipulation monitor module 340 determines whether a viewable element being manipulated by the user is a bridging element. If the manipulated viewable element is a bridging element, at block 708 the manipulation monitor module 340 identifies the next software application selected by the user after manipulating the bridging element and then monitors the user tactile manipulations performed by the user in that next software application in the manner described above with reference to blocks 402-413 of method 400. Further, at block 710, the manipulation monitor module 340 determines whether a viewable element manipulated by a user indicates the end of the operation being monitored. If not, monitoring of user activity continues for the current software application, and any user activities in any subsequent software applications in the event that the software operation spans three or more software applications.

Returning to block 706, if a manipulated viewable element is identified as a bridging element, at block 712 the attribute extractor module 344 accesses the view hierarchy 236 from the GPU 252 to identify the manipulated bridging element, its metadata, and the manner in which it is manipulated. From this information, at block 714 the manipulation monitor module 340 identifies the software applications presented as options or alternatives with respect to the action represented by the bridging element. To illustrate using the media file sharing example described above, the user's selection of the share icon in the OS framework may trigger the OS to display a view screen with a list of application icons. Each of these application icons has a function call to the corresponding software application and further may have a text description identifying the software application. From this metadata, the manipulation monitor module 340 may identify the software applications provided as options for sharing the media file.

As the manipulation monitor module 340 monitored a user's manipulations to implement a particular version of the software operation using one of the alternative software applications associated with the bridging element, the resulting viewable element manipulation sequence represents only the viewable element manipulations that are performed for that particular instance. However, with the alternative software applications identified, at block 716 the manipulation monitor module 340 can generate alternate versions of the viewable element manipulation sequence, each alternate version directed to one of the alternative software applications that the user could have selected. To illustrate, if a camera application provides the option of sharing a picture via one of an email application or a text messaging application, and the monitored user activity involved the user selecting the email application, the viewable element manipulation sequence represents the camera application-email application sequence. However, the manipulation monitor module 340 can use the viewable element manipulation sequence to generate an alternative version that represents the user instead selecting the text messaging application.

If the alternative software application has been previously analyzed by the manipulation monitor module 340 so as to generate a viewable element manipulation sequence for the associated functionality of the alternative software application, the manipulation monitor module 340 can generate an alternate version of the viewable element manipulation sequence by splicing together an initial segment of the viewable element manipulation sequence representing the actions taken by the user while in the first software application with a segment of the previously-generated viewable element manipulation sequence corresponding to the functionality that would follow in the alternative software application. To illustrate, assume the original viewable element manipulation sequence has an initial segment corresponding to the user tactile manipulations made in the camera application to capture an image and a subsequent segment corresponding to the user tactile manipulations made in the email application to compose an email that includes the picture as an attachment. If there is another viewable element manipulation sequence that has a segment representing the user tactile manipulations made in the text messaging application to attach a media file and send the media file as a text message, the manipulation monitor module 340 can create an alternative version of the original viewable element manipulation sequence that is specific to the text messaging application by replacing the original subsequent segment pertaining to the email application with the subsequent segment of the other viewable element manipulation sequence that pertains to the text messaging application.

In the event that the functionality of an alternative software application has not already been rendered into a viewable element manipulation sequence, the manipulation monitor module 340 can generate an alternative version of the original viewable element manipulation sequence that performs as much as the software operation as possible under the circumstances. To illustrate using the example described above, in the event that the text application has not been evaluated before, an alternative version of the viewable element manipulation sequence can include the initial segment pertaining to the picture capture, and then manipulation segment that represents a user tactile manipulation of the icon associated with the text application, but goes no further. In such instances, the user would then be expected to complete the software operation using tactile input.

With the determination of the original version of the viewable element manipulation sequence and one or more alternative versions thereof for one or more alternative software applications presented in the bridging element, at block 718 the voice command generation module 346 generates a base voice command syntax for a selected version of the viewable element manipulation sequence and at block 720 the voice command generation module 346 generates and stores a voice command set for the selected version of the viewable element manipulation sequence in accordance with the processes described above with reference to blocks 414, 416, and 418 of method 400 of FIG. 4. The process of blocks 718 and 720 thus may be repeated for each version of the viewable element manipulation sequence. As a result of method 700, the user's interaction with the electronic device 100 to activate one instance of a software operation that bridges between a first software application and a second software application is monitored and analyzed to generate not only a voice command set and a viewable element manipulation sequence that can be emulated for that particular instance, but also voice command sets and viewable element manipulation sequences that can be emulated for other instances of the operation that involve another software application instead of the second software application. Thus, voice command sets and emulatable viewable element manipulation sequences may be inferred without actual observation of a user performing precisely the same viewable element manipulation sequence.

FIG. 8 illustrates an example of the transition of between software applications during a software operation using a bridging element in accordance with the method 700 of FIG. 7. In the depicted example, a user has utilized a camera application (identified as "APP1") to capture a picture, in response to which the camera application presents the captured image as part of a view screen 800 (identified as "S_1"). At a top border the view screen 800 includes a set of icons representing functionality that may be employed with respect to the captured picture, one of which includes a share icon 802 that represents a sharing functionality in which the captured picture can be transmitted to other users or to remote storage locations. The user touches a location (X1,Y1) on the touchscreen 101 corresponding to a location within a range of locations associated with the share icon 802 (tactile manipulation 804). The user manipulation monitor module 340 detects the tactile manipulation 804, and in response the attribute extractor module 344 accesses the view hierarchy 236 to identify the manipulated viewable element (identified as "SHARE_PICTURE"), its metadata (the text description "Share Picture"), and the manner in which it was manipulated ("clickable"). From this information, the manipulation monitor module 340 generates an entry 806 in a viewable element manipulation sequence for the software operation being monitored.

In response to the user's selection of the share icon 802, the GPU 252 presents a view screen 808 (identified as "S_2") and the view manager 219 updates the view hierarchy 236 accordingly. The view screen 808 presents a list of software application options for sharing the picture. This list may be presented in the context of the OS framework; that is, the list may be populated by the OS 214 and the OS 214 may take care of the transfer of the picture file from the camera application to another software application selected from the list. Alternatively, the list may be presented in the context of the camera application framework; that is, the camera application may populate the list from software applications pre-identified by the camera application. From the listed applications, the user selects the WhatsApp™ application for sharing the picture, and thus the user touches a location (X2,Y2) on the touchscreen 101 corresponding to a location within a range of locations in the list for the WhatsApp™ application (tactile manipulation 810). The user manipulation monitor module 340 detects the tactile manipulation 810, and in response the attribute extractor module 344 accesses the view hierarchy 236 to identify the manipulated viewable element (identified as a list of applications "APP_LIST" with the list item "WHATSAPP" selected), its metadata (the text description "Media Delivery Applications"), and the manner in which it was manipulated (list selection). From this information, the manipulation monitor module 340 generates an entry 812 in the viewable element manipulation sequence for the software operation being monitored.

Further, from the description or other metadata, the user manipulation monitor module 340 identifies, via the textual description contained in the view hierarchy 236, the share icon 802 and the resulting displayed list as a bridging element. Accordingly, the user manipulation monitor module 340 identifies from the displayed list the software applications available as options and generates an alternative applications list 814, which includes a list of the alternative software applications and pertinent information.

The user's selection of the WhatsApp™ application (identified as "APP2") from the list triggers the OS 214 to initiate execution of the WhatsApp™ application at the electronic device 100, as well as the transfer of a copy of the picture to the WhatsApp™ application. This triggers the WhatsApp™ application to present a view screen 816 that guides the user in selecting a recipient for the initiated message from a displayed contact list 818. The user touches a location (X3,Y3) on the touchscreen 101 corresponding to a location within a range of locations of one of the listed contacts (tactile manipulation 820). The user manipulation monitor module 340 detects the tactile manipulation 820, and in response the attribute extractor module 344 accesses the view hierarchy 236 to identify the manipulated viewable element (identified as a list of contacts "CONTACT_LIST"), its metadata (the text description "Contact List"), and the manner in which it was manipulated (list selection). From this information, the manipulation monitor module 340 generates an entry 822 in the viewable element manipulation sequence for the software operation being monitored.

The user's selection of the contact in the contact list triggers the WhatsApp™ application to present a view screen 824 for the user to complete and send the message with the picture attached. Although not illustrated in FIG. 8, the manipulation monitor module 340 can continue to monitor the user's subsequent tactile manipulations in this view screen and any subsequent view screens until the message has been sent and thus the operation has completed. This results in a viewable element manipulation sequence, which includes the entries 806, 812, and 822, that represents a version of the software operation that transitions from the camera application to the WhatsApp™ application. The voice command generator module 346 thus can generate a voice command set for this original version of the viewable element manipulation sequence. Further, the manipulation monitor module 340 can use the alternative software applications listed in list 814 and their corresponding icon locations in the view screen 808 to generate alternative versions of the viewable element manipulation sequence that would instead cause the transition from the camera application to another one of the listed alternative applications. To illustrate, an alternative version of the viewable element manipulation sequence could be created so that the viewable element manipulation associated with view screen is a contact to the touchscreen 101 at a location associated with the listed Gmail application, which would thus result in a transition from the camera application to the Gmail application. The voice command generator module 346 then may generate a separate voice command set for each of these versions, thereby enabling the user to have access to different voice commands that alternatively select between the different software applications for sharing a captured picture.

FIG. 9 illustrates a method 900 for implementing the voice command detection phase 113 (FIG. 1) and manipulation emulation phase 114 (FIG. 1) for detecting a user's issuance of a voice command for an operation and emulating the corresponding viewable element manipulation sequence so as to activate an instance of the operation in accordance with at least one embodiment. For ease of illustration, the method 900 is described in the example context of the implementation of the electronic device 100 described above with reference to FIGS. 2 and 3.

The method 900 initiates at block 902 with the receipt of voice input from a user. The utterances of a user are received via the microphone 246 and converted by the speech synthesizer 320 to text 322. At block 904 the NLP engine 222 parses the text 322 to identify voice components in the text 322 that may be relevant to a voice command. To illustrate, a voice command typically includes a statement of certain command actions, such as "compose", "send", "to", "with", "take picture", and the like, as well as variables that serve as inputs for certain actions, such as naming the recipient of a message, providing the text to be placed in the body of a message, and the like. To this end, the NLP engine 222 may identify the relevant command terms and variables and provide them to the command mapper module 350 as the character sequence 330, while omitting extraneous details in the voice command. To illustrate, the voice input of "take a picture and send it to Sam Jones" may be parsed into a character sequence 330 of "take picture send to <Sam Jones>".

At block 906, the command mapper module 350 accesses a stored voice command set for an operation. In at least one embodiment, multiple software operations may have dynamically inferred voice commands using the techniques described herein, and thus the command mapper module 350 may utilize a voice command database implemented in, for example, the persistent storage 230 to store the various voice command sets. As part of the access process, the command mapper module 350 may utilize certain keywords from the character sequence 330 to narrow down the potential voice command sets. To illustrate, if the character string has the key word of "picture", then the command mapper module 350 may access only those voice command sets representing software operations pertaining to pictures or images.

With a voice command set selected, at block 908 the command mapper module 350 attempts to match the voice components represented by the character sequence 330 to potential voice commands within the voice command set. In some embodiments, the voice command set is represented as a base voice command syntax of command terms in a certain sequence, along with alternative terms or synonyms for one or more of the command terms. To illustrate, a voice command set for sending an email message may have a base voice command syntax of "compose email to <recipient> stating <message body>" along with alternative terms of "send" and "prepare" for the base command term "compose", an alternative terms of "email message" for the base command term "email", and an alternative term of "reading" for the base command term "stating." In such instances, the command mapper module 350 attempts to detect a match by comparing each permutation of the base command syntax and the various alternative terms to the voice components of the character sequence 330 until either a sufficient match is found or all permutations have been tested. Alternatively, the voice command set may be represented by a set of one or more complete voice command variations (which may have been previously generated as permutations of a base voice command syntax), in which case the command mapper module 350 attempts to detect a match by comparing each voice command variation with the voice components.

At block 910, the command mapper module 350 assesses whether it has found a candidate voice command that sufficiently matches the voice components. The match may need not be an exact match, but instead may be considered sufficient even though there may be some deviation. To illustrate, some actions of an operation may be deemed as optional, and thus the aspects of a voice command pertaining to these options may be deemed to be optional as well. For example, in an email composition operation, the VSCI utility 225 may determine a viewable element manipulation sequence that includes a user's input of a recipient email address in a cc: field, and thus the voice commands of a voice command set may have command terms pertaining to the user specifying a recipient for the cc: field. However, the user manipulation monitor module 340 may have a set of rules or guidelines that specify which fields are mandatory and which fields are optional. Thus if the voice components match a voice command for the email composition operation except for the lack of identification of a cc: recipient, the command mapper module 350 may deem there to be a sufficient match.

In the event that a sufficient match is not found in the selected voice command set, the method 900 may return to block 906, whereby the command mapper module 350 selects the next candidate voice command set and repeats the process of blocks 906, 908, and 910 for this voice command set. Otherwise, if a sufficient match is detected, at block 912 the command mapper module 350 signals a command match 368 to the manipulation emulator module 348. In response the manipulation emulator module 348 accesses the viewable element emulation sequence associated with the matching voice command and then emulates the viewable element emulation sequence at the electronic device 100. As noted above, this emulation can include injecting emulated tactile manipulations of various user input components 242 so that the emulation is transparent to the OS 214 and the software application(s) 216 involved in the software operation. Alternatively, the manipulation emulator module 348 may signal the intended viewable element manipulation directly to the OS 214, and the OS 214 then formats the corresponding inputs to the software application 216 as though a user had provided the tactile manipulation of the viewable element.

In many instances, the voice command will include variables associated with command actions, and thus part of the emulation process includes injecting the variables at the appropriate point in the emulation process. To illustrate, a voice command of "send email to Sam Jones" would be recognized by the command mapper module 350 as having the recipient variable "Sam Jones", and thus the manipulation emulator module 348 would emulate a user's manipulation of the to: field of the email message being composed by emulating keyboard input so as to insert the character string "Sam Jones" into the to: field. Further, as noted above, there may not be a perfect match between the voice input and a voice command. In such instances, the manipulation emulator module 348 either may partially emulate the viewable element manipulation sequence up to the point there is a disparity between the voice command and the voice input and then cease any further emulation, at which point the user may complete the operation manually, or the manipulation emulator module 348 may seek additional input from the user to address the discrepancy, and then continue with the remainder of the emulation. To illustrate, if a voice command set is generated for the basic command syntax of "send email to <recipient> stating <message body>", but the voice input only matches the portion "send email to <recipient>", that is, the user has not specified the message body, the manipulation emulator module 348 may perform the portion of the viewable element manipulation sequence that initiates composition of an email via an email application then fills in the to: field with the identified recipient variable, and then ceases further emulation. This in turn would require the user to manually fill in the message body field and then select the send icon to transmit the email message. Alternatively, the manipulation emulator module 348 may instead prompt the user, via a display screen or via audio prompting, to supply the message body via voice input or keyboard input, and this input is then filled into the message body field and the manipulation emulator module 348 completes the emulation by emulating selection of the send icon.

User help websites, instructional videos and other help videos, and integrated help facilities in the software applications themselves often provide step-by-step instruction on how to perform certain operations with the software application. This step-by-step instruction often is presented as a text description, screenshots of view screens presented by the software, voice-over audio explaining the actions needed to enact the operation, or a combination thereof. As such, help information for a software application can be leveraged to dynamically infer voice commands and viewable element manipulation sequences for operations of the software application without requiring manual input or a standardized interface. FIGS. 10-18 illustrate techniques and examples for such processes.

Figure 10:
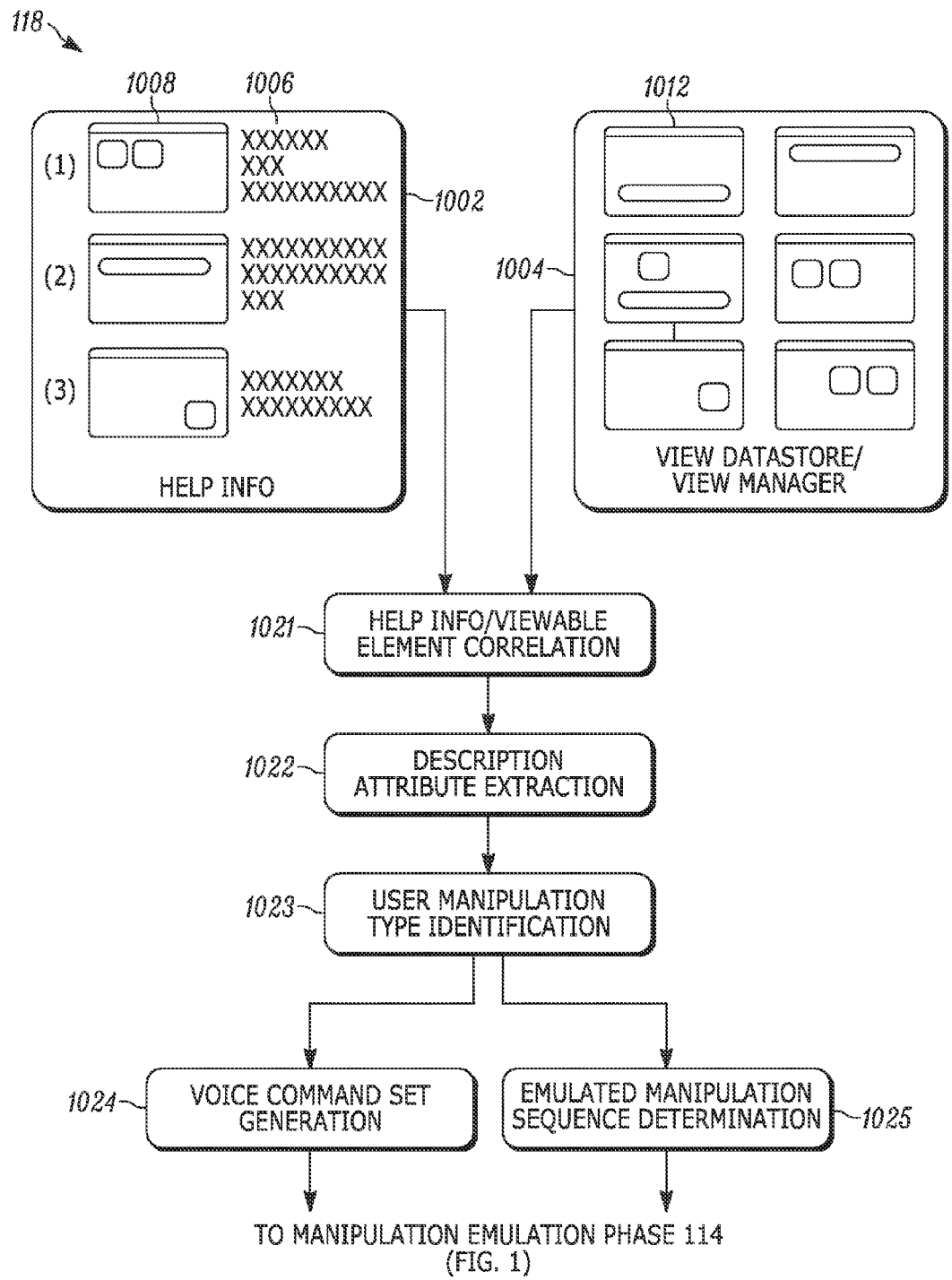
FIG. 10 is a diagram illustrating an overview of a process for dynamically inferring a voice command set and corresponding viewable element manipulation sequence for an operation of a software application at an electronic device through analysis of user help information associated with the software application in accordance with at least one embodiment of the present disclosure.

FIG. 10 depicts a general overview of the help information analysis process 118 that may be implemented during the manipulation sequence inference phase 111 (FIG. 1) in accordance with some embodiments. In the course of the help information analysis process 118 for analyzing a selected software operation, at least two sets of information are utilized: help information 1002 and view screen information 1004. The help information 1002 (one embodiment of help information 160 of FIG. 1) is text, graphics, imagery, video, audio, and other information that generated or collected to assist users in using the software application 216 to perform a corresponding software operation. The help information 1002 may take the form of a webpage or document accessed from a remote server, a help tutorial video streamed from a media server, help documentation that is integrated with the software application 216 and locally stored at the electronic device 100 at the time of installation of the software application 216, and the like. Typically, the help information 1002 is arranged so as to present a step-by-step sequence 1006 of actions that the user is to take with respect to the software application 216 in order to activate the software operation. This step-by-step sequence 1006 may utilize screenshots (e.g., screenshot 1008) of various view screens of the software application 216 at different stages of the operation, text descriptions (e.g., text description 1010) of the screenshots 1008 or other text descriptions of the action to be performed, and the like. If implemented in a video form, the help information 1002 typically includes video capture of a sequence of view screens of the software application as the performance of the software application is demonstrated, and may be accompanied by adjoining textual description within the video or with an instructional voice-over that accompanies the video.

The help information 1002 may be obtained in a variety of ways. In some embodiments, a remote server searches websites and other accessible network sites for published help information associated with identified software applications and obtains and stores the help information from these sites. At that point, the remote server or associated resource may then analyze the help information to infer voice commands and viewable element manipulation sequences in accordance with the processes described herein. The resulting voice commands/viewable element manipulation sequences then may be distributed to one or more users' electronic devices, as described in detail below with reference to FIG. 19. In other embodiments, the remote server may obtain the help information but refrain from the analysis until requested to do so by a user, at which point the help information analysis is performed and the results are supplied to the requesting user. Still further, in some embodiments, the help information analysis is performed by the electronic device 100 itself, and thus it is the electronic device 100 that searches for and obtains the help information pertaining to an operation of a selected software application and then performs the help information analysis process described herein.

The view screen information 1004 provides a representation of the view screens, and the viewable elements contained therein, provided by the software application 216. This representation may be implemented as, for example, a database of the view screens themselves (e.g., view screen 1012), one or more data structures that identify the view screen and the viewable elements contained therein (as well as any descriptive metadata associated with the view screen or viewable elements), or a combination thereof. In an implementation whereby the help information analysis process 118 is performed primarily by the electronic device 100, the view screen information 1004 may be maintained by, for example, the view manager 219 as part of the view hierarchy 236.

As shown, the help information analysis process 118 has at least the following stages: a help information/viewable element correlation stage 1021, a description attribute extraction phase 1022, a manipulation type identification phase 1023, a voice command generation phase 1024, and an emulated manipulation sequence determination phase 1025. As a general overview, during the help information/viewable element correlation stage 1021, help information pertaining to steps or actions described in the help information 1002 are correlated to particular viewable elements of the software application 216. That is, the steps or actions in the help information 1002 that reference a viewable element of the software application 216 are identified in the software application 216, and their order of reference in the help information 1002 is registered. At the description attribute extraction phase 1022, textual descriptions or other metadata for the matching viewable elements is obtained. At the manipulation type identification phase 1023, the type of manipulation of the viewable elements as described by the help information 1002 is identified. The matched viewable elements and their order of reference, the descriptive metadata, and the manipulation type information then are used at the voice command generation phase 1024 to generate a voice command set for the software operation, and further are used at the emulated manipulation sequence determination phase 1025 to generate a viewable element manipulation sequence that can be emulated by the VSCI utility 225 so as to activate the software operation in response to detection of the user issuing one of the voice commands of the voice command set, as was described above with reference to the voice command detection phase 113 and the manipulation emulation phase 114.

Figure 11:
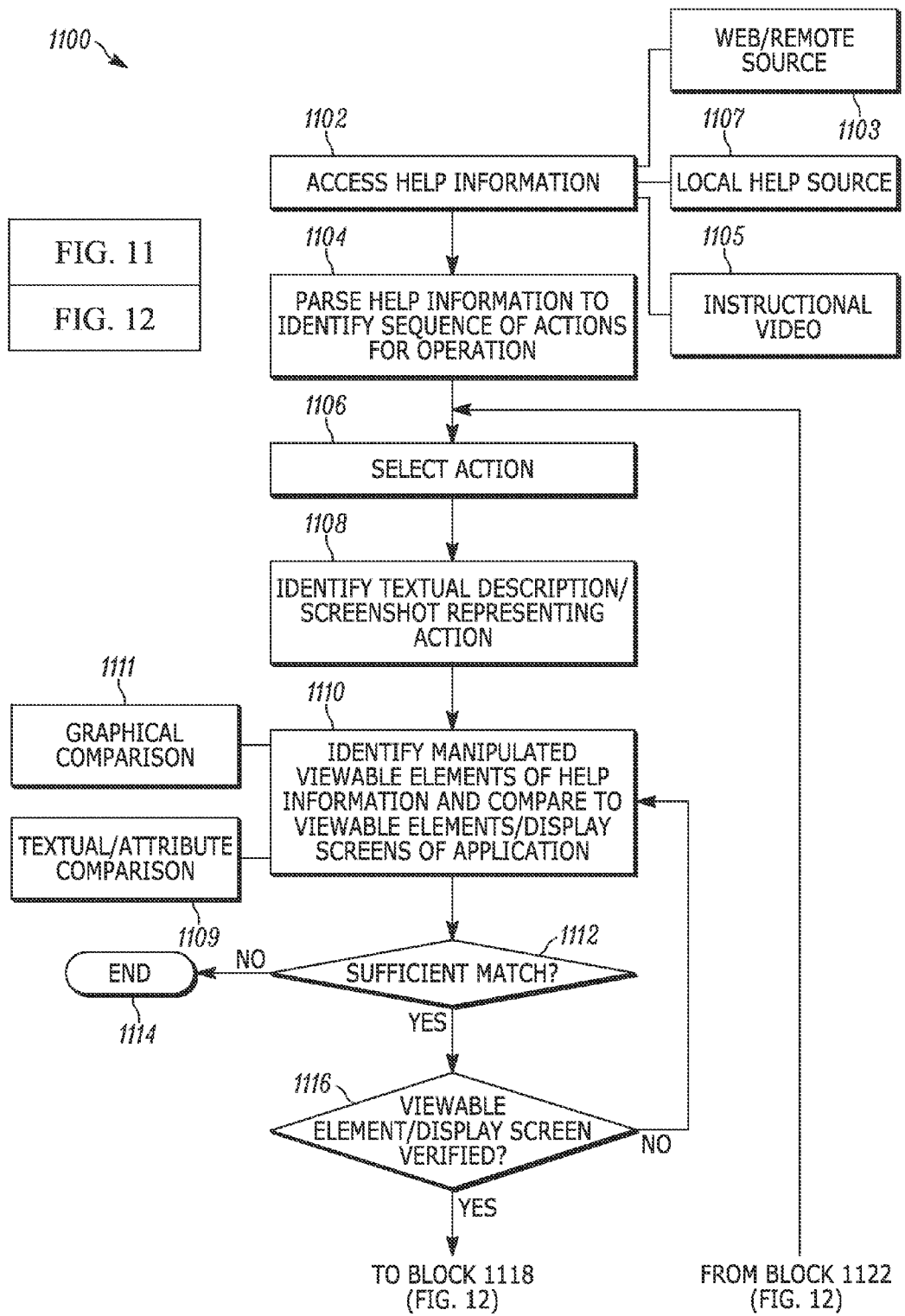
FIGS. 11 and 12 are diagrams that together illustrate a method for analyzing user help information to dynamically infer a viewable element manipulation sequence and a voice command set for the viewable element manipulation sequence based on user help information in accordance with at least one embodiment of the present disclosure.
Figure 12:
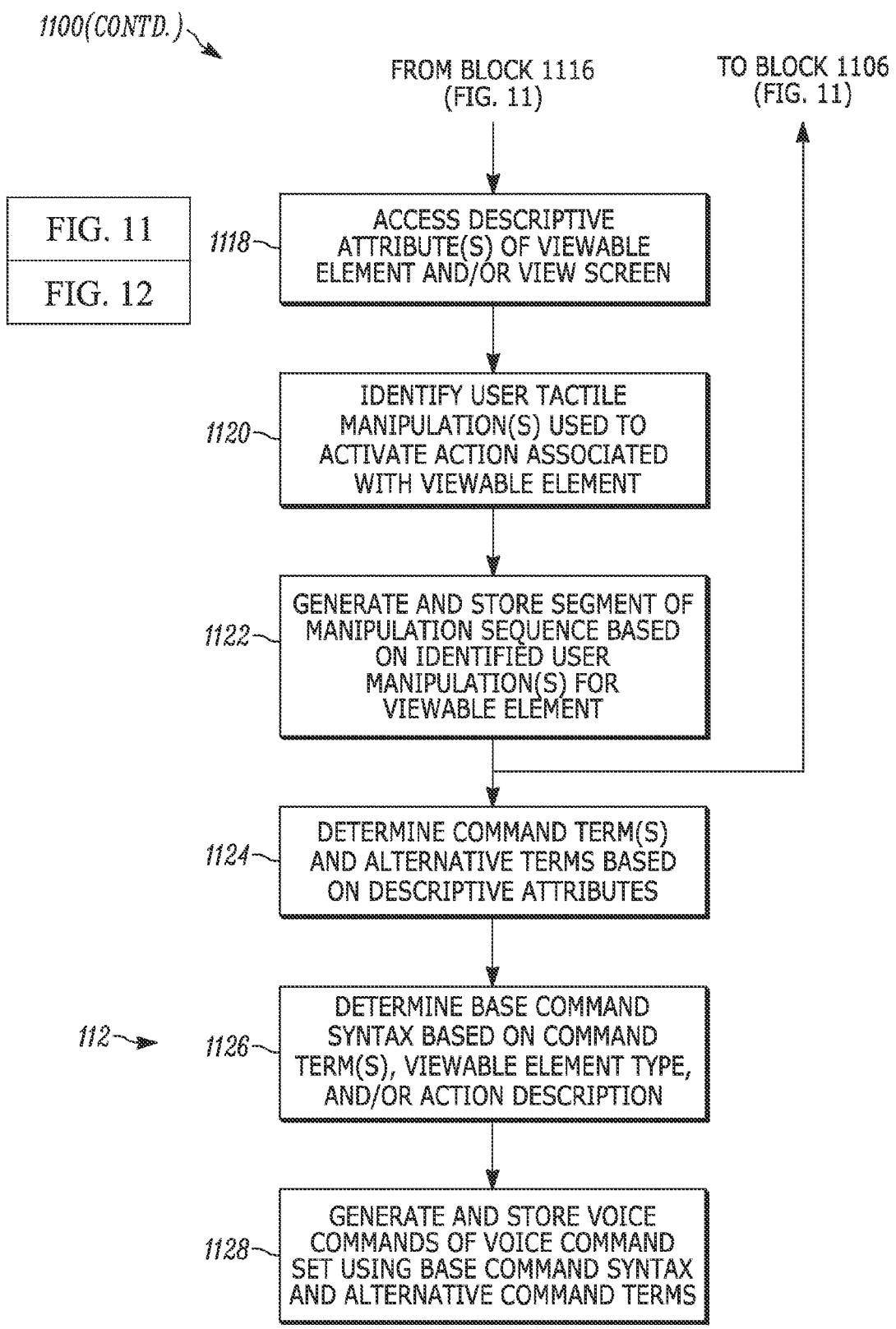

FIGS. 11 and 12 depict a method 1100 representing a particular implementation of the stages 1021-1025 of the help information analysis process 118 of FIG. 10 in accordance with some embodiments. For ease of illustration, the method 1100 is described in the context of the stages 1021-1025 being performed using the help information analysis module 342, attribute extractor module 344, voice command generator module 346, command mapper module 350, and manipulation emulator module 348 at the VSCI utility 225 of the electronic device 100. However, the described process instead may be performed at a cloud service or other remote server using counterparts to the modules 342, 344, 346, 348, and 350. Moreover, the described process may be performed in part at a remote server and in part by the electronic device 100.

The method 1100 initiates at block 1102 with the search for, and access to, help information 1002 for a software operation of a software application 216. To illustrate, in response to initial installation of an email application at the electronic device 100, the VSCI utility 225 may recognize the email application as such and thus the help information analysis module 342 may commence to attempt to develop voice command capability for the email composition process for the email application by searching the Internet for published help information. Similarly, cloud service may begin offering a text messaging application for download to its users, and thus the cloud service may attempt to develop voice command capability for the text message composition process of the text messaging application by searching its archives and the Internet for published help information pertaining to the text message composition process for that particular version of the text messaging application. As noted previously, the help information 1002 can take any of a variety of forms, such as a help information published as a webpage 1103, an instructional video 1105 available for download or streaming, or help information 1107 from a local help source, such as the help information integrated with the software application 216.

With the help information 1002 accessed, at block 1104 the help information analysis module 342 parses the help information 1002 to identify the sequence of actions represented in the help information 1002 for performing the corresponding software operation. To illustrate, the help webpage 1103 may present instructions for capturing and sharing an image in a camera application using an enumerated step-by-step format, and the help information analysis module 342 may identify each action based on this enumeration of steps. As another example, the help information 1002 may present a sequence of screenshots, with each screenshot having corresponding text description, and the help information analysis module 342 may identify each screenshot as a different action, and the sequence of screenshots defines the order of the corresponding actions. Similarly, in an instructional video 1105, different screenshots may be presented in the image stream representing the video, and the help information analysis module 342 may identify the introduction of each new screenshot in the instructional video 1105 as another step or action in the sequence of actions representing the software operation.

With the help information 1002 parsed into a sequence of actions representing the software operation, at block 1106 the help information analysis module 342 selects the first action in the sequence and at block 1108 the help information analysis module 342 identifies one or both of the textual description or screenshot provided by the help information 1002 for the selected action. If the help information 1002 is an instructional video, the audio commentary included in the instructional video may be converted to text for this process.

At block 1110, the help information analysis module 342 identifies the one or more viewable elements that are manipulated as part of the selected action from the textual description or screenshot identified at block 1108. The help information analysis module 342 then compares the identified viewable elements(s) with viewable elements in one or more view screens 1012 in the view screen information 1004 for the software application 216. To illustrate, the textual description of one of the described steps in the help information 1002 may state "click the 'compose email' icon to initiate composition an email message". From this, the help information analysis module 342 may identify the pertinent keywords as "click" and "compose email", and thus conduct a textual/attribute comparison 1109 by searching the view screen information 1004 for a viewable element of manipulation type "clickable" and with attribute metadata of one or more of "email," "compose," "prepare," or "create." As another example, a screenshot for a described step in the help information 1002 may utilize a bold red circle, arrow, or other visual reference to highlight the "compose email" graphical element that represents the icon viewable element that the user is to select to initiate composition of an email message. The help information analysis module 342 thus may conduct a graphical comparison 1111 by searching the various view screens 1012 of the view screen information 1004 to find a view screen having a viewable element that sufficiently matches in appearance the identified graphical element. Further, the screenshot may contain graphical representation of text, such as text in an icon that provides the title of the icon, in which case the screenshot can be processed through optical character recognition (OCR) to identify the text, this OCR text may then be used in the textual comparison 1109. In the event there is both a screenshot and text description for the selected action, the help information analysis module 342 can, for example, perform the graphical comparison 1111 to match the viewable element from the screenshot to a viewable element in one of the view screens of the software application, and then use the textual comparison 1109 to confirm that the match is accurate by confirming that the descriptive attributes of the matching viewable element match the pertinent keywords from the text description in the help information 1002.

At block 1112, the help information analysis module 342 assesses whether there is a sufficient match between the textual description or screenshot information for the selected action in the help information 1002 and a viewable element of a view screen of the software application 216. This process can include, for example, calculating a confidence value for the match and determining the match is sufficient based on a comparison of the confidence value to a threshold confidence. In some instances, multiple potential matches may be identified, in which case the help information analysis module 342 may determine a confidence value for each potential match and then select the potential match with the highest confidence. If a sufficient match was not found, then the help information analysis module 342 cannot with confidence generate voice command functionality for the operation as it is unable to identify the viewable element that should be manipulated for the selected action. Accordingly, at block 1114 the help information analysis module 342 terminates further analysis of the help information 1002.

Software applications often undergo frequent revision. These revisions may result in viewable elements having their positions shifted within a view screen, changes to the appearance of the viewable element, or changes to the functionality performed when the viewable element is manipulated. Further, a version of the software application may have viewable elements that are very similar in appearance of that have similar descriptive metadata, but which activate different functionality. Moreover, the same viewable element may activate different functionality depending on which view screen it is located. Thus, even though the help information analysis module 342 may find what it believes to be a match between a viewable element depicted or described in the help information and a viewable element in a view screen of the software application, it may be that manipulation of the matching viewable element does not provide the functionality described in the help information, either because it is not the same viewable element, or its functionality has changed because the help information 1002 describes a different version of software than that being analyzed.

Thus, even with the determination of a sufficient match at block 1112, in some embodiments the VSCI utility 225 programmatically performs a verification process 1116 to verify that the matching viewable element of the software application provides the described action or functionality from the help information 1002. This verification process 1116 can be conducted in a variety of ways. In some instances, the help information 1002 illustrates a sequence of screen shots, and thus the VSCI utility 225 can coordinate with the OS 214 to execute the software application and emulate a user's tactile manipulation of the matching viewable element in its corresponding view screen. If the matching viewable element is a true match, then the next view screen presented by the software application 216 should match the next screenshot in the screenshot sequence in the help information 1002. If the presented view screen does not match the next screenshot, then the help information analysis module 342 can conclude that the potentially matching viewable element is not in fact the matching element. As another example, the help information 1002 may contain text information describing the view screen following the instructed manipulation of the viewable element, or describing the action that results from the instructed manipulation of the viewable element. From this text description, the help information analysis module 342 can derive one or more pertinent keywords. These keywords then may be compared with the metadata of the viewable elements of the next view screen presented by the software application after the emulated manipulation of the potentially matching viewable element. If the descriptive metadata does not seem to correlate with the keywords, then the help information analysis module 342 can conclude that the potentially matching viewable element does not in fact match the viewable element referenced in the help information 1002.

If the potentially matching viewable element is deemed to not match during the programmatic verification process, the method 1100 may return to block 1110 and another potentially matching viewable element may be assessed as described above with reference to blocks 1112, 1114, and 1116. Otherwise, if the potentially matching viewable element is programmatically verified, at block 1118 the attribute extractor module 344 accesses the view hierarchy 236 via the view manager 219 to access the descriptive attributes and other metadata for the viewable element, as well as the view screen in which it is located. This information may have already been obtained during the matching process, and thus block 1118 may be skipped in such cases.

Unlike the manipulation monitoring process 116, the help information analysis process 118 does not have the benefit of directly observing the manner in which a user actually manipulates a viewable element in order to actuate the corresponding action. Instead, at block 1120 the help information analysis module 342 identifies the one or more tactile manipulations the user would have performed using the matching viewable element in order to activate the corresponding action selected at block 1106 using the context or description provided by the corresponding passage of the help information 1002. To illustrate, if the relevant portion of the help information 1002 contains text that states "click the send button to send the email message", then the help information analysis module 342, after confirming the matching viewable element is a "clickable" type viewable element, would identify the intended manipulation as a user touching a region of a touchscreen corresponding to the display region of the viewable element, or using a cursor to "click" this region. As another example, if the relevant portion of the help information 1002 contains text that states "select a contact from the contact list", then the help information analysis module 342 may determine that the intended manipulation is "list selection".

With the viewable element of the software application and its metadata identified and with the one or more manipulations of the viewable element intended to activate the corresponding action, at block 1122 the help information analysis module 342 generates a corresponding segment of a viewable element manipulation sequence 352 using this information. To illustrate, if the viewable element is a clickable icon and the intended manipulation is a click on the displayed clickable icon, the help information analysis module 342 may generate an entry in the viewable element manipulation sequence that indicates a contact at the touchscreen 101 at a location (X,Y) within a range of locations about which the clickable icon is displayed.

The method 1100 then returns to block 1106 for the selection of the next action in the action sequence presented by the help information 1002 and the processes of blocks 1108-1122 is repeated for each action in the sequence until all actions in the action sequence of the help information 1002 have been processed and a corresponding manipulation of a viewable element for each action has been registered in the viewable element manipulation sequence 352.

When the viewable element manipulation sequence 352 has been generated and stored, the method 1100 enters the voice command generation phase 112 (FIG. 1). At block 1124, the voice command generator module 344 determines one or more command terms and alternative terms for some or all of the viewable element manipulations represented in the viewable element manipulation sequence 352 in a manner similar to that described above with reference to block 414 of method 400 of FIG. 4. Further, at block 1126 the voice command generator module 344 determines a base command syntax in a manner similar to that described above with reference to block 416 of method 400. However, when determining the command terms and the base command syntax, the voice command generator module 344 further can utilize the help information 1002 to guide these processes. To illustrate, the text description in the help information can be used to generate additional keywords that can be used as command terms or alternative terms, or which may be used to rank or weigh various command terms that may the key terms from the help information 1002. With the command terms, alternative terms, and base command syntax determined, at block 1128 the voice command generator module 344 can generate and store a voice command set for the software operation using the process described above with reference to block 418 of method 400.

The voice command set and viewable element manipulation sequence 352 generated in this manner may then be used to process voice input representing a voice command for the processed operation and emulating the corresponding viewable element manipulation sequence 352 as described above with reference to method 900 of FIG. 9. That is, although generated using difference processes, a voice command set and corresponding viewable element manipulation sequence generated through the help information analysis process 118 may be processed for voice command detection and user manipulation emulation in the same manner as a voice command set and corresponding viewable element manipulation sequence generated through the manipulation monitoring process 116.

FIGS. 13-18 illustrate a particular example of the manipulation sequence inference phase 111 and the voice command set generation phase 112 as represented by method 1100 of FIGS. 11 and 12 in accordance with at least one embodiment. For the following, the software operation is an operation to compose and send an email message using a version of the Microsoft Outlook™ email application. The help information 1002 in this example is presented as a webpage having an enumerated sequence of actions to be taken by the user, along with a corresponding screenshot and text description. Each of FIGS. 13-17 illustrates a portion of the help information 1002 corresponding one of the actions of the sequence.

FIG. 13 illustrates an initial portion 1300 of the help information 1002 that describes the initial step in composing an email. The portion 1300 includes text description 1302 instructing the user to "left mouse click the <create mail> icon to open a New Email Window" and a corresponding screenshot 1304 showing the view screen in which the <create mail> icon is found. Further, as illustrated in FIG. 13, the screenshot 1304 may include an embellishment, such as enlarged arrow 1306, that is not part of the actual view screen represented by the screen shot, but rather is a graphical feature added to emphasis the viewable element to be manipulated by the user.

In accordance with method 1100 described above, the help information analysis module 342 uses the text description 1302 and the screenshot 1304 (and enlarged arrow 1306) to identify the displayed <create mail> icon as representing the viewable element to be manipulated first, and uses the descriptive terms of "create mail", "left click", and "new email" to identify the represented action as "create new email", and match the <create mail> icon to a viewable element identified as "CREATE MAIL" at location (X1,Y1) in a view screen identified as "OUTLOOK_1", and further identifies this viewable element as being of type clickable.

Moreover, from the text description, the help information analysis module 342 determines that the intended user manipulation is a left-click of a mouse around the location (X1,Y1). From this information, the help information analysis module 342 generates the illustrated entry 1308 as the initial entry of a viewable element manipulation sequence 352 for the compose email operation.

Figure 14:
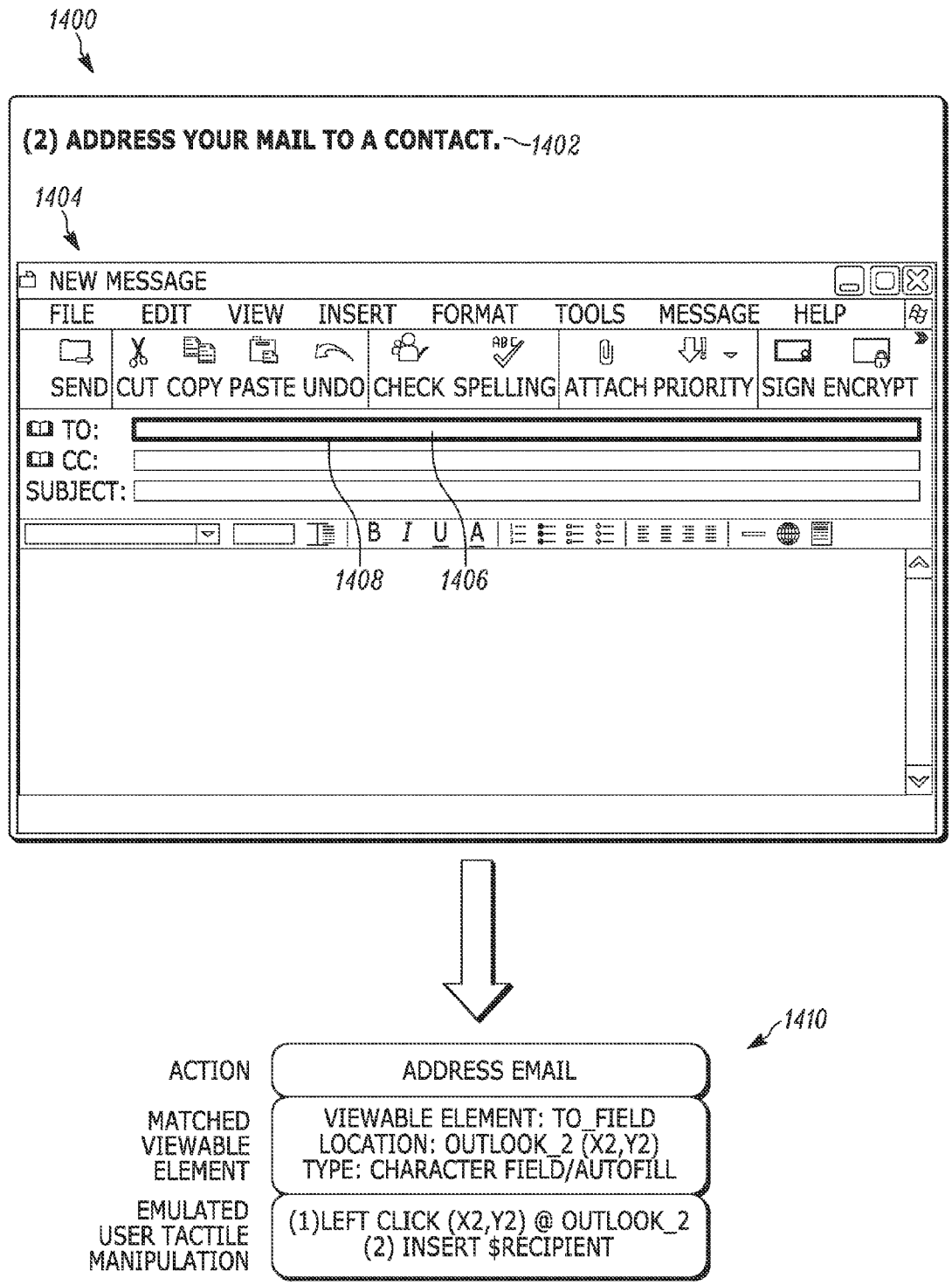

FIG. 14 illustrates a second portion 1400 of the help information 1002 that describes the second step in composing an email. The portion 1400 includes text description 1402 instructing the user to "Address your mail to a contact" and a corresponding screenshot 1404 showing the view screen that is presented when the <create mail> icon is clicked, which in this example is a view screen presenting various fields of the email message for user entry, including a to: field 1406 which is emphasized by an embellishment 1408 in the form of a bright colored border added to the boundary of the to: field 1406. The help information analysis module 342 uses the text description 1402 and the screenshot 1404 (and embellishment 1408) to identify the to: field 1406 as representing the viewable element to be manipulated for this action, and uses the descriptive terms of "address", "to", and "contact" to identify the represented action as "address email", and match the to: field 1406 to a viewable element identified as "TO_FIELD" at location (X2,Y2) in a view screen identified as "OUTLOOK_2", and further identifies this viewable element as being of type character field/autofill. Moreover, from the text description and an understanding of the operation of a character field-type viewable element, the help information analysis module 342 determines that the intended user manipulation is a left-click of a mouse at the location (X2,Y2) followed by entry of a variable $RECIPIENT in the form of a character string. From this information, the help information analysis module 342 generates the illustrated entry 1410 as the second entry of the viewable element manipulation sequence 352 for the compose email operation.

FIG. 15 illustrates a third portion 1500 of the help information 1002 that describes the third step in composing an email. The portion 1500 includes text description 1502 instructing the user to "Fill in text in the <subject> box pertaining to the email theme . . . " and a corresponding screenshot 1504 showing the same view screen as was presented in portion 1400. However, screenshot 1504 differs from screenshot 1404 in that it is a subject: field 1506 which is emphasized by an embellishment 1508 in the form of a bright colored border added to the boundary of the subject: field 1506. The help information analysis module 342 uses the text description 1502 and the screenshot 1504 (and embellishment 1508) to identify the subject: field 1506 as representing the viewable element to be manipulated for this action, and uses the descriptive terms of "fill in", "text", "subject", and "box" to identify the represented action as "subject fill", and match the subject: field 1506 to a viewable element identified as "SUBJECT_FIELD" at location (X3, Y3) in the "OUTLOOK_2" view screen, and further identifies this viewable element as being of type character field. Moreover, from the text description and an understanding of the operation of a character field-type viewable element, the help information analysis module 342 determines that the intended user manipulation is a left-click of a mouse at the location (X3,Y3) followed by entry of a variable $SUBJECT in the form of a character string. From this information, the help information analysis module 342 generates the illustrated entry 1510 as the third entry of the viewable element manipulation sequence 352 for the compose email operation.

FIG. 16 illustrates a fourth portion 1600 of the help information 1002 that describes the fourth step in composing an email. The portion 1600 includes text description 1602 instructing the user to "Type in your message into the mail body of the email" and a corresponding screenshot 1604 showing the same view screen as was presented in portions 1400 and 1500, but with an embellishment 1608 in the form of a bright colored border added to the boundary of a body: field 1606. The help information analysis module 342 uses the text description 1602 and the screenshot 1604 (and embellishment 1608) to identify the body: field 1606 as representing the viewable element to be manipulated for this action, and uses the descriptive terms of "type in", "message", and "body" to identify the represented action as "body fill", and match the body: field 1606 to a viewable element identified as "BODY_FIELD" at location (X4,Y4) in the "OUTLOOK_2" view screen, and further identifies this viewable element as being of type character field. Moreover, from the text description and an understanding of the operation of a character field-type viewable element, the help information analysis module 342 determines that the intended user manipulation is a left-click of a mouse at the location (X4,Y4) followed by entry of a variable $BODY in the form of a character string. From this information, the help information analysis module 342 generates the illustrated entry 1610 as the fourth entry of the viewable element manipulation sequence 352 for the compose email operation.

Figure 17:
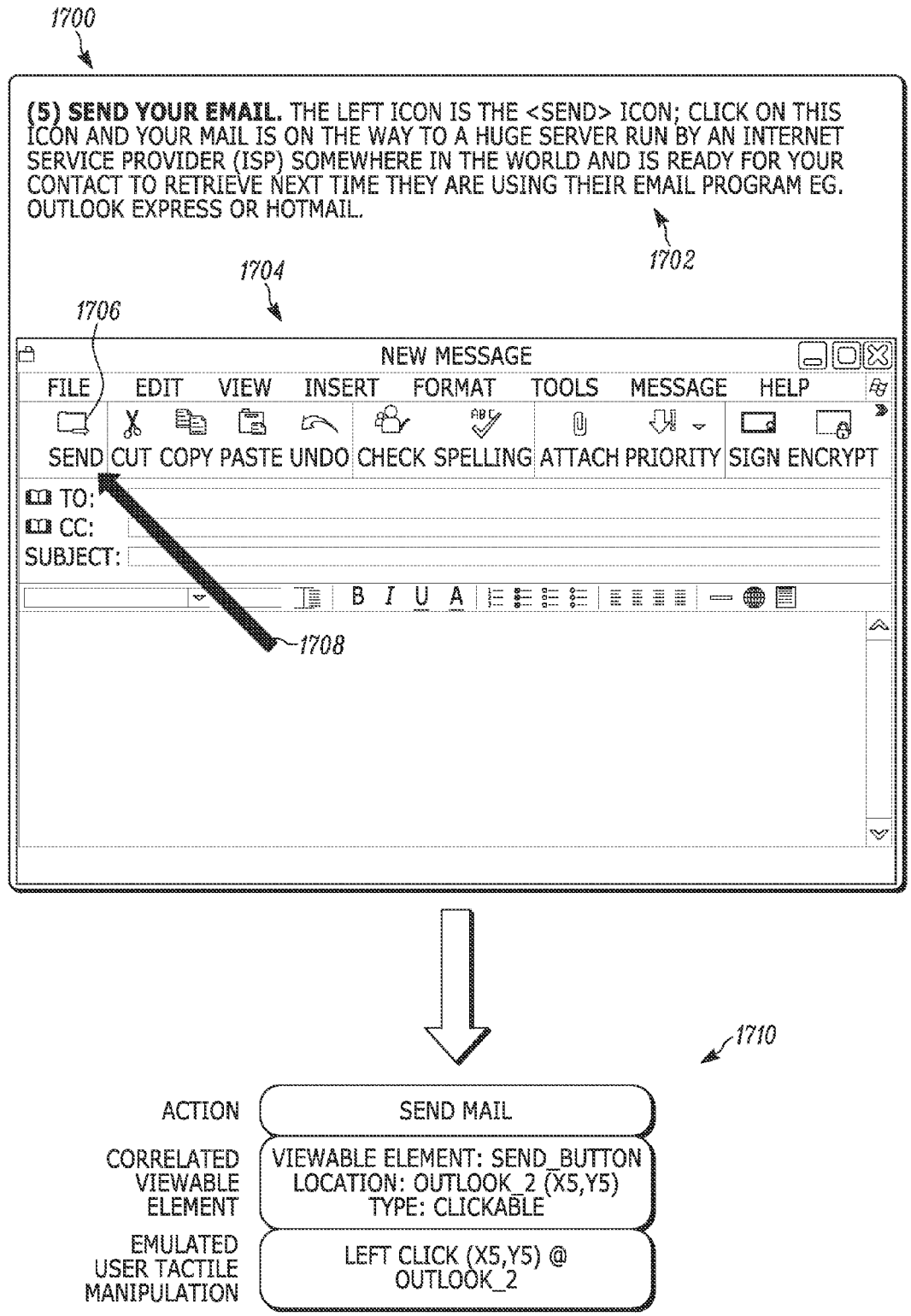

FIG. 17 illustrates a fifth portion 1700 of the help information 1002 that describes the fifth step in composing an email. The portion 1700 includes text description 1702 instructing the user to "Send your email. The left icon is the <send> icon: click on this icon and your email is on the way . . . " and a corresponding screenshot 1704 showing the same view screen as was presented in portions 1400, 1500, and 1600 but with an embellishment 1708 in the form of a bright arrow pointing to an icon 1706. The help information analysis module 342 uses the text description 1702 and the screenshot 1704 (and embellishment 1708) to identify the icon 1706 as representing the viewable element to be manipulated for this action, and uses the descriptive terms of "send", "mail", "click on", and "mail is on the way" to identify the represented action as "send mail", and match the icon 1706 to a viewable element identified as "SEND_BUTTON" at location (X5,Y5) in the "OUTLOOK_2" view screen, and further identifies this viewable element as being of clickable type. Moreover, from the text description and an understanding of the operation of a clickable-type viewable element, the help information analysis module 342 determines that the intended user manipulation is a left-click of a mouse at the location (X5,Y5). From this information, the help information analysis module 342 generates the illustrated entry 1710 as the fifth and final entry of the viewable element manipulation sequence 352 for the compose email operation.

Figure 18:
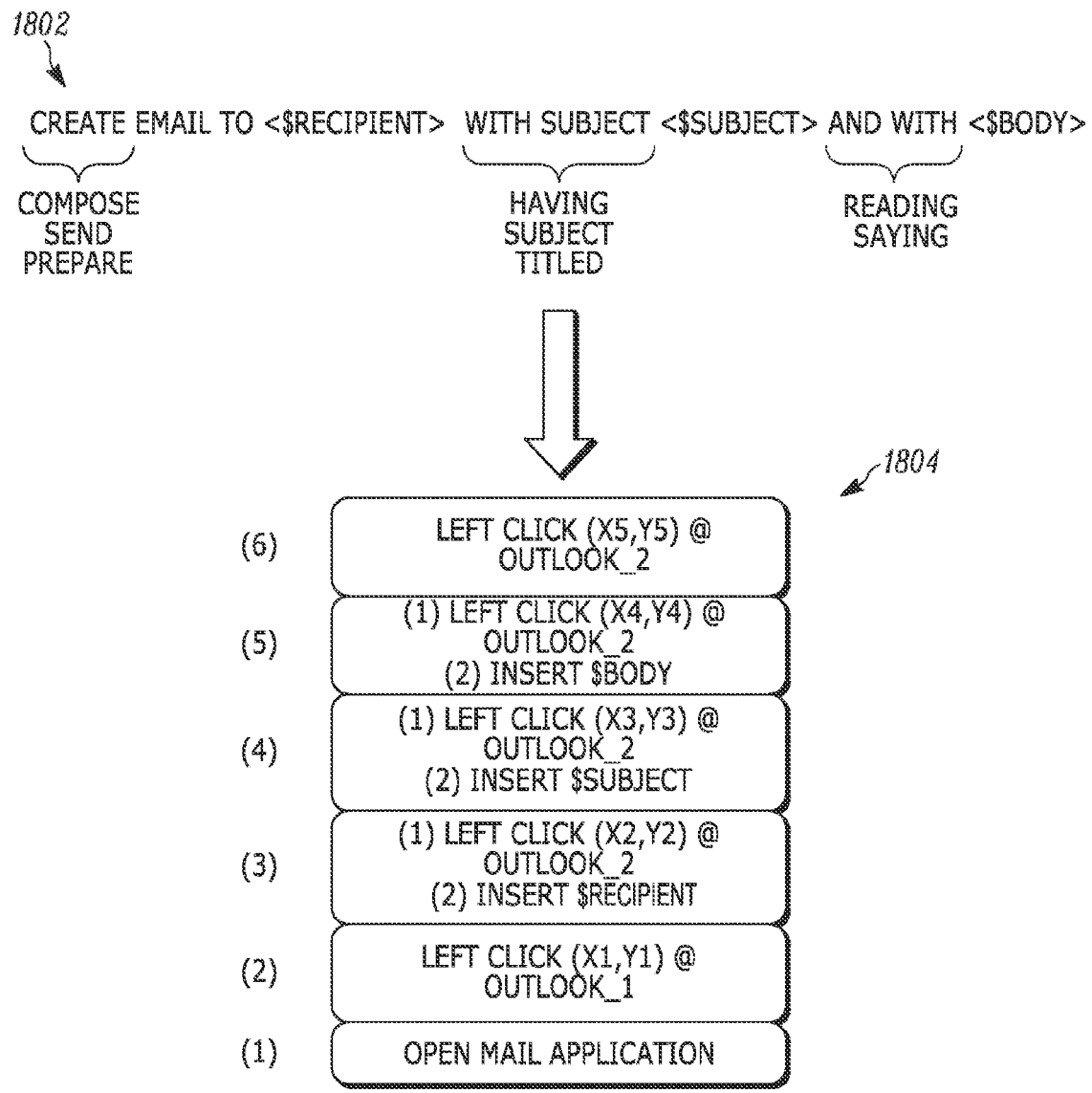

FIG. 18 illustrates an example of the processes of generating a voice command set 1802 and a viewable element manipulation sequence 1804 from the example illustrated by FIGS. 13-17. The voice command set 1802 and the viewable element manipulation sequence 1804 represent an example of the voice command set 366 and the viewable element manipulation sequence 352, respectively, of FIG. 3. From the keywords described above, the voice command generator module 346 generates a base command syntax of "create email to <$RECIPIENT> with subject <$SUBJECT> and body <$BODY>". Further, with the assistance of the NLP engine 222 (FIG. 2), the voice command generator module 346 determines alternative terms of "compose", "send", and "prepare" for the command term "create", alternative terms "having subject" or "titled" for the command term "with subject", and alternative terms "reading" and "saying" for the command term "with body". From this, the voice command generator module 346 can generate a set of voice commands representing some or all of the permutations of the base command syntax and the alternative terms. Moreover, although not illustrated by FIG. 18, the based command syntax can also include alternative constructions that omit certain portions or which rearrange the order of some portions, and these alternative constructions likewise may be included in the voice command generation process.

The resulting voice command set 1802 is stored at the electronic device 100 and is associated with the viewable element manipulation sequence 1804 also stored at the electronic device 100. As illustrated by FIG. 18, the viewable element manipulation sequence 1804 can include a data structure or other composition that represents a sequence of tactile viewable element manipulations to be emulated by the manipulation emulator module 348 in order to perform an instance of the compose email operation.

Figure 19:
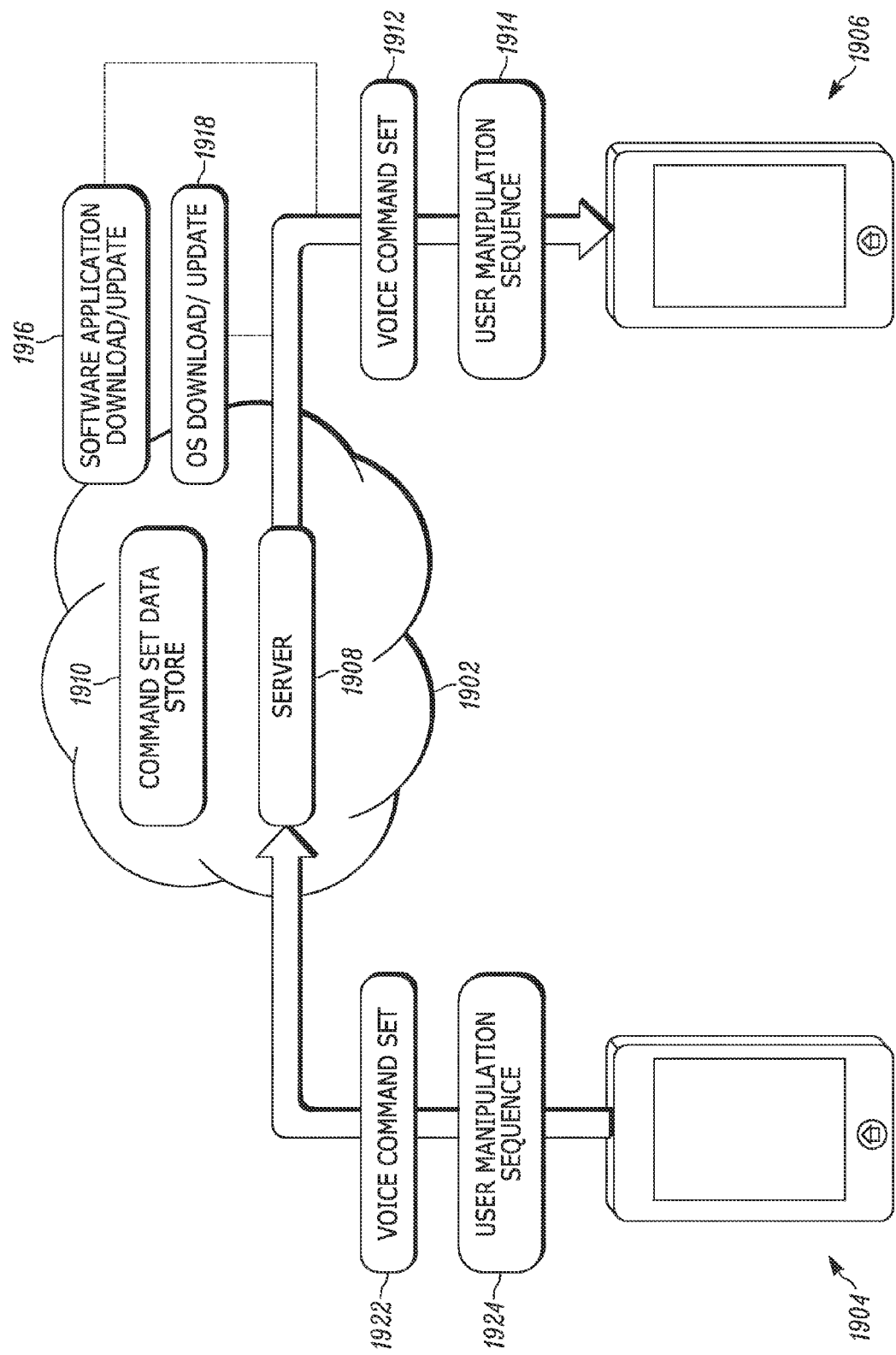
FIG. 19 is a diagram illustrating a system for sharing dynamically inferred voice command sets and corresponding viewable element manipulation sequences for software operations among multiple electronic devices in accordance with at least one embodiment of the present disclosure.

The techniques described above provide effective ways to dynamically infer voice commands and corresponding viewable element manipulations sequences to be emulated to enact a software application. However, many users may be using the same software application to perform the same operation on their respective electronic devices, and thus the effort made in making this dynamic inference in one instance may be leveraged by distributing representations of the voice command set and the viewable element manipulation sequence to other electronic devices for their use. Similarly, a networked service provider or software provider may undertake the analyses described above and then distribute the resulting voice command set and viewable element manipulation sequence to its users, thereby sparing each user from having to separately go through the same process. FIG. 19 illustrates an example voice command distribution system 1900 for distributing voice command information in this manner.

In the depicted example, the voice command distribution system 1900 includes a networked service provider or networked software provider (identified as "cloud service 1902") that may connect over one or more wired or wireless networks to one or more electronic devices of associated users, such as electronic devices 1904 and 1906. The cloud service 1902 may include a software source or distributor (e.g., an online "app store" such as the Google Play™ or Apple™ iTunes™ facilities), a cellular service provider, and the like.

The cloud service 1902 includes a networked server 1908 and a command set data store 1910. The command set data store 1910 stores representations of voice command sets and corresponding viewable element manipulation sequences for identified operations of one or more software applications, and the server 1908 operates to transmit the stored voice command set/viewable element manipulation sequences to users' electronic devices for incorporation. The distribution of a voice command data 1912 and corresponding viewable element manipulation sequence data 1914 to the electronic device 1906 of a user may be initiated by the user. For example, the user may connect with the cloud service 1902 to obtain and install the voice command data 1912 and the viewable element manipulation sequence data 1914 for a software operation. In other embodiments, the cloud service 1902 may initiate the transfer, or "push", the voice command data 1912 and the viewable element manipulation sequence data 1914 to a user's electronic device 1906. To illustrate, the cloud service 1902 may aggregate voice command information for one or more operations of a software application. When a user downloads the software application, or an updated version thereof, from the cloud service 1902, the server 1908 may access the voice command information for the software application (or for the corresponding version of the software application) and bundle it with the software application data being distributed to the electronic device 1906 as part of the software application download/update process 1916 so that the voice command functionality is installed along with the software application or version update at the electronic device 1906. As another example, the voice command functionality may be implemented in the OS of the electronic device 1906. When a user downloads a copy of the OS, or an update to the OS, from the cloud service 1902, the server 1908 may identify a set of the most popular software applications used with the OS, access the voice command information for this set of software applications, and bundle the voice command information with the OS data being distributed to the electronic device 1906 as part of the OS download/update process 1918. Thus, the voice command information may be integrated into operations of the electronic device 1906 during install of the OS or OS update.

In some embodiments, the cloud service 1902 performs the dynamic voice command inference processes described above. However, in other embodiments, a dynamic voice command inference process is performed at a user's electronic device 1904, and the electronic device 1904 then shares the resulting voice command set 1922 and viewable element manipulation sequence 1924 with the cloud service 1902. The cloud service 1902 then may integrate this information into the command set data store 1910 for subsequent distribution to other electronic devices in the manner described above.

Much of the inventive functionality and many of the inventive principles described above are well suited for implementation with or in software programs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs minimal experimentation. Therefore, in the interest of brevity and minimization of any risk of obscuring the principles and concepts according to the present disclosure, further discussion of such software, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/ dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In an electronic device, a method comprising:
analyzing help information associated with a software application to identify a sequence of manipulations of viewable elements associated with an instance of an operation by the software application, wherein the help information is to assist a user in interacting with the software application to perform the operation and comprises at least one of: a textual tutorial with one or more screen shots of the software application; a video tutorial for performing the operation; and an audio tutorial for performing the operation;
generating a voice command set based on the sequence of manipulations of viewable elements; and
storing the voice command set.

2. The method of claim 1, wherein analyzing the help information includes:
identifying a visual reference to an action of the operation to be actuated by the software application responsive to manipulation of an identified viewable element associated with the software application; and
identifying a term associated with the action; and
wherein generating the voice command set includes:
generating at least one voice command for the voice command set based on the identified term.

3. The method of claim 2, wherein identifying the term associated with the action comprises:
accessing a set of one or more descriptive attributes associated with the identified viewable element; and
identifying the term associated with the action based on the set of one or more descriptive attributes.

4. The method of claim 3, wherein accessing the set of one or more descriptive attributes associated with the viewable element comprises:
accessing the set of one or more descriptive attributes from a view hierarchy having a text representation of elements within one or more view screens.

5. The method of claim 4, wherein identifying the term associated with the action comprises:
identifying the term from at least one of: the view hierarchy; a natural language processor; and an alternative term database.

6. The method of claim 2, wherein identifying the term associated with the action comprises:
identifying the term associated with the action based on a text description in the help information that references the action.

7. The method of claim 1, further comprising:
receiving voice input from a user;
determining the voice input represents a voice command of the voice command set; and
performing an emulated manipulation sequence of viewable elements based on the voice command to actuate an instance of the operation by the software application, the emulated manipulation sequence based on the sequence of manipulations of viewable elements.

8. The method of claim 1, wherein analyzing the help information comprises:
matching a first screenshot of the software application presented in the help information with a first view screen of the software application;
matching a first graphical element of the first screenshot that is referenced by the help information with a first viewable element of the first view screen; and
identifying the first viewable element of the first view screen as a viewable element manipulated in the sequence of manipulations of viewable elements.

9. The method of claim 8, wherein analyzing the help information further comprises:
matching a second screenshot of the software application presented in the help information with a second view screen of the software application;
matching a second graphical element of the second screenshot that is referenced by the help information with a second viewable element of the second view screen;
identifying the second viewable element of the second view screen as a viewable element manipulated in the sequence of manipulations of viewable elements; and
identifying an order between the manipulation of the first viewable element and the manipulation of the second viewable element in the sequence of manipulations of viewable elements based on an order of reference between the first graphical element and the second graphical element in the help information.

10. The method of claim 8, wherein analyzing the help information comprises:
matching a text description of a user manipulation action in the help information with a second viewable element of a second view screen of the software application; and identifying the second viewable element of the second view screen as a viewable element manipulated in the sequence of manipulations of viewable elements; and identifying an order between the first viewable element and the second viewable element in the sequence of manipulations of viewable elements based on an order of reference between the first graphical element and the text description in the help information.

11. The method of claim 1, wherein analyzing the help information comprises:

matching a text description of a first user manipulation action in the help information with a first viewable element of a first view screen of the software application; and identifying the first viewable element of the first view screen as a viewable element manipulated in the sequence of manipulations of viewable elements.

12. The method of claim 1, wherein analyzing the help information associated with the software application to identify the sequence of manipulations of viewable elements comprises:

identifying a manipulation of a viewable element as representing an action referenced in the help information; and programmatically verifying that the manipulation of the viewable element results in the action referenced in the help information.

13. The method of claim 1, further comprising:

accessing the help information from one or more of: a remote networked system; and a help datastore locally stored in association with the software application.

14. The method of claim 1, further comprising:

providing a representation of the voice command set and the sequence of manipulations of viewable elements to a remote networked system for distribution to one or more other electronic devices.

15. In an electronic device, a method comprising:

identifying a first viewable element of a view screen of a software application as being associated with a first action of an operation performed by the software application based on help information associated with the software application, wherein the help information is to assist a user in interacting with the software application to perform the operation and comprises at least one of: a textual tutorial with one or more screen shots of the software application; a video tutorial for performing the operation; and an audio tutorial for performing the operation;

identifying a second viewable element of a view screen of the software application as being associated with a second action of the operation based on the help information associated with the software application;

generating a voice command set representing the operation based on the first viewable element and the second viewable element; and storing the voice command set.

16. The method of claim 15, wherein generating the voice command set comprises:

determining a first term associated with the first action;
determining a second term associated with the second action;
determining an order between the first action and the second action within the operation; and
generating a voice command of the voice command set based on the first term, the second term, and the order between the first action and the second action.

17. The method of claim 16, wherein:

determining the first term associated with the first action includes determining the first term based on a text description in the help information that is associated with the first action.

18. The method of claim 16, wherein:

determining the first term associated with the first action includes determining the first term based on at least one descriptive attribute associated with the first viewable element.

19. The method of claim 15, further comprising:

receiving a voice input from a user;
determining the voice input represents a voice command of the voice command set; and
performing an emulation of a manipulation sequence of viewable elements based on the voice command to actuate an instance of the operation by the software application.

20. The method of claim 19, further comprising:

identifying a manipulation of the first viewable element that actuates the first action;
identifying a manipulation of the second viewable element that actuates the second action;
determining an order between the first action and the second action within the operation; and
generating the manipulation sequence of viewable elements based on the manipulation of the first viewable element, the manipulation of the second viewable element, and the order between the first action and the second action.

21. The method of claim 15, wherein identifying the first viewable element as being associated with the first action comprises:

matching a screenshot in the help information that is associated with the first action with a view screen of the software application that contains the first viewable element.

22. The method of claim 15, wherein identifying the first viewable element as being associated with the first action comprises:

matching the first viewable element with text description in the help information that is associated with the first action.

23. An electronic device comprising:

a help information analysis module to analyze help information associated with a software application to identify a sequence of manipulations of viewable elements associated with an instance of an operation by the software application, wherein the help information is to assist a user in interacting with the software application to perform the operation and comprises at least one of: a textual tutorial with one or more screen shots of the software application; a video tutorial for performing the operation; and an audio tutorial for performing the operation;

a voice command generator module, coupled to the help information analysis module, to generate a voice command set based on the sequence of manipulations of viewable elements; and a datastore to store the voice command set.

24. The electronic device of claim 23, wherein:

the help information analysis module also identifies a visual reference to an action of the operation to be actuated by the software application responsive to manipulation of an identified viewable element associated with the software application; and the voice command generator module generates the voice command set by identifying a term associated with the action and by generating at least one voice command of the voice command set based on the identified term.

25. The electronic device of claim 24, wherein the voice command generator module is to identify the term associated with the action from at least one of:
   a set of one or more descriptive attributes associated with the identified viewable element; and
   a text description in the help information that references the action.

26. The electronic device of claim 25, further comprising:
   a view manager, coupled to the voice command generator module, to store a view hierarchy having a text representation of viewable elements within one or more view screens; and
   wherein the voice command generator module is to determine the set of one or more descriptive attributes from the view hierarchy.

27. The electronic device of claim 23, further comprising:
   a command mapper module, coupled to the datastore, to determine a received voice input represents a voice command of the voice command set; and
   a manipulation emulation module, coupled to the command mapper module, to perform an emulated manipulation sequence of viewable elements based on the voice command to actuate an instance of the operation by the software application, the emulated manipulation sequence based on the sequence of manipulations of viewable elements.

28. The electronic device of claim 23, wherein:
   the help information analysis module is to correlate a first screenshot of the software application presented in the help information with a first view screen of the software application and to correlate a first graphical element of the first screenshot that is referenced by the help information with a first viewable element of the first view screen; and
   the help information analysis module further is to identify the first viewable element of the first view screen as a viewable element manipulated in the sequence of manipulations of viewable elements.

* * * * *